US007850522B2

(12) United States Patent
Walker et al.

(10) Patent No.: US 7,850,522 B2
(45) Date of Patent: Dec. 14, 2010

(54) APPARATUS, SYSTEMS AND METHODS FOR FACILITATING A PAYOUT OF A GAMING DEVICE

(75) Inventors: Jay S. Walker, Ridgefield, CT (US); James A. Jorasch, New York, NY (US); Jose A. Suarez, Fairfield, CT (US); Robert C. Tedesco, Fairfield, CT (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 11/113,703

(22) Filed: Apr. 25, 2005

(65) Prior Publication Data

US 2005/0192086 A1 Sep. 1, 2005

Related U.S. Application Data

(60) Provisional application No. 60/565,301, filed on Apr. 26, 2004, provisional application No. 60/576,255, filed on Jun. 2, 2004.

(51) Int. Cl.
*A63F 9/24* (2006.01)
*A63F 13/00* (2006.01)

(52) U.S. Cl. ............................ 463/25; 463/15; 463/20; 463/42; 273/138.1; 273/138.2; 273/142 R

(58) Field of Classification Search ............. 463/16–20, 463/25, 40–42; 273/138.1–2, 143 R
See application file for complete search history.

(56) References Cited

U.S. PATENT DOCUMENTS 4,636,951 A 1/1987 Harlick ....................... 364/412
4,669,731 A 6/1987 Clarke .................... 273/143 R (Continued)

FOREIGN PATENT DOCUMENTS

GB 2144644 A * 3/1985

(Continued)

OTHER PUBLICATIONS

Grochowski, John, "Players Look for Edge With Casino Gimmicks", Chicago Sun-Times, Aug. 25, 1995, Section: Weekend Plus; Gaining, p. 15, NC.

(Continued)

*Primary Examiner*—John M Hotaling, II
*Assistant Examiner*—Ryan Hsu
(74) *Attorney, Agent, or Firm*—K&L Gates LLP

(57) ABSTRACT

In accordance with some embodiments, a method provides for determining, based on a first random number, an outcome for a first game play conducted at a gaming device, thereby determining a first outcome and determining an amount to be output as a result of the first outcome, thereby determining a first payout. The first payout is based on a probability of obtaining the first outcome and the first wager. The method further provides for determining, based on a second random number, an outcome for a second game play conducted at the gaming device, thereby determining a second outcome and determining an amount to be output as a result of the second outcome, thereby determining a second payout. The second payout is based on the first payout. In one embodiment both the first and second game plays are initiated in response to receiving, from the player, an initiation signal and a wager.

39 Claims, 15 Drawing Sheets

U.S. PATENT DOCUMENTS

| | | | | | |
|---|---|---|---|---|---|
| 4,760,527 | A | | 7/1988 | Sidley | 364/412 |
| 4,837,422 | A | | 6/1989 | Dethloff et al. | 235/380 |
| 4,837,728 | A | | 6/1989 | Barrie et al. | 364/412 |
| 4,856,787 | A | | 8/1989 | Itkis | 273/237 |
| 5,042,818 | A | | 8/1991 | Weingardt | 273/292 |
| 5,083,271 | A | | 1/1992 | Thacher et al. | 364/411 |
| 5,116,055 | A | | 5/1992 | Tracy | 273/138 A |
| 5,123,649 | A | | 6/1992 | Tiberio | 273/143 R |
| 5,173,851 | A | | 12/1992 | Off et al. | 364/401 |
| 5,178,390 | A | | 1/1993 | Okada | 273/143 R |
| 5,179,517 | A | | 1/1993 | Sarbin et al. | 364/410 |
| 5,242,163 | A | | 9/1993 | Fulton | 273/85 CP |
| 5,275,400 | A | | 1/1994 | Weingardt et al. | 273/85 CP |
| 5,280,909 | A | | 1/1994 | Tracy | 273/138 A |
| 5,324,035 | A | | 6/1994 | Morris et al. | 273/138 A |
| 5,342,047 | A | | 8/1994 | Heidel et al. | 273/85 CP |
| 5,342,049 | A | | 8/1994 | Wichinsky et al. | 273/119 R |
| 5,356,140 | A | | 10/1994 | Dabrowski et al. | 273/85 CP |
| 5,377,973 | A | | 1/1995 | Jones et al. | 273/85 CP |
| 5,393,057 | A | | 2/1995 | Marnell, II | 273/85 CP |
| 5,393,061 | A | | 2/1995 | Manship et al. | 273/143 R |
| 5,409,225 | A | | 4/1995 | Kelly et al. | 273/138 R |
| 5,472,194 | A | | 12/1995 | Breeding et al. | 273/138 A |
| 5,482,289 | A | | 1/1996 | Weingardt | 273/269 |
| 5,494,287 | A | | 2/1996 | Manz | 273/143 R |
| 5,544,892 | A | | 8/1996 | Breeding | 273/292 |
| 5,559,312 | A | | 9/1996 | Lucero | 235/380 |
| 5,564,700 | A | | 10/1996 | Celona | 463/27 |
| 5,580,309 | A | | 12/1996 | Piechowiak et al. | 463/16 |
| 5,603,502 | A | | 2/1997 | Nakagawa | 273/292 |
| 5,611,535 | A | | 3/1997 | Tiberio | 273/143 R |
| 5,611,730 | A | | 3/1997 | Weiss | 463/20 |
| 5,621,201 | A | | 4/1997 | Langhans et al. | 235/380 |
| 5,639,088 | A | | 6/1997 | Schneider et al. | 273/138.2 |
| 5,655,961 | A | | 8/1997 | Acres et al. | 463/27 |
| 5,674,128 | A | | 10/1997 | Holch et al. | 463/42 |
| 5,695,400 | A | | 12/1997 | Fennell, Jr. et al. | 463/42 |
| 5,702,304 | A | | 12/1997 | Acres et al. | 463/29 |
| 5,741,183 | A | | 4/1998 | Acres et al. | 463/42 |
| 5,755,621 | A | | 5/1998 | Marks et al. | 463/42 |
| 5,761,647 | A | | 6/1998 | Boushy | 705/10 |
| 5,770,533 | A | | 6/1998 | Franchi | 463/42 |
| 5,811,772 | A | | 9/1998 | Lucero | 235/380 |
| 5,823,879 | A | | 10/1998 | Goldberg et al. | 463/42 |
| 5,833,537 | A | * | 11/1998 | Barrie | 463/21 |
| 5,836,586 | A | | 11/1998 | Marks et al. | 273/292 |
| 5,848,932 | A | | 12/1998 | Adams | 463/20 |
| 5,851,147 | A | | 12/1998 | Stupak et al. | 463/13 |
| 5,882,260 | A | | 3/1999 | Marks et al. | 463/13 |
| 5,910,048 | A | | 6/1999 | Feinberg | 463/25 |
| 5,947,821 | A | | 9/1999 | Stone | 463/13 |
| 5,967,896 | A | * | 10/1999 | Jorasch et al. | 463/25 |
| 5,979,702 | A | | 11/1999 | Hennessey et al. | 221/206 |
| 5,980,384 | A | | 11/1999 | Barrie | 463/16 |
| 6,012,982 | A | | 1/2000 | Piechowiak et al. | 463/16 |
| 6,019,374 | A | | 2/2000 | Breeding | 273/292 |
| 6,033,307 | A | | 3/2000 | Vancura | 463/20 |
| 6,039,648 | A | | 3/2000 | Guinn et al. | 463/16 |
| 6,077,162 | A | | 6/2000 | Weiss | 463/26 |
| 6,077,163 | A | | 6/2000 | Walker et al. | 463/26 |
| 6,089,975 | A | | 7/2000 | Dunn | 463/16 |
| 6,093,100 | A | | 7/2000 | Singer et al. | 463/13 |
| 6,113,102 | A | | 9/2000 | Marks et al. | 273/292 |
| 6,135,882 | A | | 10/2000 | Kadlic | 463/13 |
| 6,142,872 | A | | 11/2000 | Walker et al. | 463/16 |
| 6,220,959 | B1 | | 4/2001 | Holmes, Jr. et al. | 463/13 |
| 6,234,897 | B1 | | 5/2001 | Frohm et al. | 463/20 |
| 6,264,560 | B1 | | 7/2001 | Goldberg et al. | 463/42 |
| 6,287,202 | B1 | | 9/2001 | Pascal et al. | 463/42 |
| 6,312,332 | B1 | | 11/2001 | Walker et al. | 463/23 |
| 6,334,814 | B1 | * | 1/2002 | Adams | 463/20 |
| 6,361,441 | B1 | | 3/2002 | Walker et al. | 463/42 |
| 6,364,765 | B1 | | 4/2002 | Walker et al. | 463/16 |
| 6,471,208 | B2 | | 10/2002 | Yoseloff et al. | 273/143 R |
| 6,599,192 | B1 | * | 7/2003 | Baerlocher et al. | 463/25 |
| 6,645,074 | B2 | | 11/2003 | Thomas et al. | 463/20 |
| 6,656,048 | B2 | | 12/2003 | Olsen | 463/25 |
| 6,663,487 | B1 | | 12/2003 | Ladner | 463/13 |
| 6,692,353 | B2 | | 2/2004 | Walker et al. | 463/16 |
| 7,175,521 | B2 | | 2/2007 | McClintic | 463/9 |
| 7,201,657 | B2 | | 4/2007 | Baerlocher et al. | 463/20 |
| 2002/0103018 | A1 | | 8/2002 | Rommerdahl et al. | |
| 2003/0078101 | A1 | | 4/2003 | Schneider et al. | 463/42 |
| 2003/0130027 | A1 | | 7/2003 | Aida | |

FOREIGN PATENT DOCUMENTS

| | | |
|---|---|---|
| GB | 2 161 008 A | 1/1986 |
| WO | 96/011079 | 1/1997 |

OTHER PUBLICATIONS

"Revealing the Casinos Best-Kept Secrets", Atlantic City Insider, Oct. 1996, vol. 1, No. 2.

Rose, Bob, "New Ways for the House to Win", St. Louis Post-Dispatch, Oct. 3, 1996, Section: Get Out, p. 50.

Sorensen, Rick et al., IGT Press Releases, "Triple Play Draw Poker Takes Casino Industry by Storm", Feb. 18, 1998, (http //www igtgame coin/press/02-18-98 html).

Ciaffone, Bob (coach999@concentric.net), "Re: Duplicate poker tourneys?", The Gambling Forum Archive<BR>General Poker Theory<BR>Aug. 2000 Digest, (http //www twoplustwo com/digests/genpokarch_aug00_msg html), posted on Aug. 31, 2000.

Website: "Off the Kuff: Poker tournaments illegal", (http //www offthekuff com/mt/archives/003112 html), Mar. 8, 2004.

Kelley, Brent, "Best Ball—Definition of Best Ball", (http //golf about com/cs/golfterms/g/bldef_bestball htm), download date: May 7, 2004.

Website: "Hold 'Em Challenger™ Video Poker", IGT, (http //www igt com/GamingGroup/Games/game asp?pid=5.12.108.119 &theme—id=2549&b...) download date: May 7, 2004.

Website: "Home of the Underdogs—Entry: Grid Poker", (http //www the-underdogs org/game/php?id=4218), download date: May 7, 2004.

Website: Rules of Card Games: Bridge, (http //www pagat com// boston/bridge html), download date: May 7, 2004.

Website: "Solitaire Central—Poker Patience Pack", (http //www solitairecentral com/pokerpak html), download date: May 7, 2004.

Website: "Action Gaming Inc / Video Poker Design / Architecture of Success / Matrix Poker", (http //www actiongaming com/ productdesigns/matrix_poker asp), download date: Jun. 3, 2004.

"And Keep Doubling!", phrases, saying and idioms at *The Phrase Finder*, (http //www phrase org uk/bulletin board/6/messages/463. html). 1 page, download date Apr. 30, 2007.

Bluejay, Michael, "The Matingale Betting System", VegasClick. com, Martingale Betting System—The Pros & Cons; (http:// vegasclick.com/gambling/maringale-betting-sytem.html) download date Apr. 30, 2007. 4 pp.

* cited by examiner

600

| | RANDOM NUMBER 605 | FIRST REEL OUTCOME 610 | SECOND REEL OUTCOME 615 | THIRD REEL OUTCOME 620 |
|---|---|---|---|---|
| R600-1 | 00001 | LEMON | LEMON | PLUM |
| R600-2 | 00002 | LEMON | LEMON | LEMON |
| | ∘∘∘ | ∘∘∘ | ∘∘∘ | ∘∘∘ |
| R600-3 | 10698 | BAR | BAR | LEMON |
| R600-4 | 10699 | BAR | BAR | BAR |
| R600-5 | 10700 | PAYBACK | PAYBACK | PAYBACK |

FIG. 6

700A

| | OUTCOME 705A | PAYOUT 710A |
|---|---|---|
| R700A-1 | LEMON - LEMON - PLUM | 0 |
| R700A-2 | LEMON - LEMON - LEMON | 5 |
| R700A-3 | PLUM - PLU M - BAR | 2 |
| R700A-4 | BAR - BAR - BAR | 500 - (SUM OF ALL PAYOUTS IN SESSION) |
| R700A-5 | CHERRY - CHERRY - CHERRY | 5 X ( LAST DEPENDENT PAY OUT IN SESSION) |
| R700A-6 | WILD - WILD - WILD | RANDOM NUMBER {50...1200 } - (SUM OF L AST 3 PAYOUTS) |

FIG. 7A

700B

| | OUTCOME 705B | PAYOUT 710B |
|---|---|---|
| R700B-1 | OUTCOME A DURING SEGMENT 1 | 10 FOR 1ST OCCURRENCE |
| R700B-2 | | 20 FOR 2ND OCCURRENCE |
| R700B-3 | OUTCOME B DURING SEGMENT 1 | 15 FOR ALL OCCURRENCES |
| R700B-4 | LAST POSSIBLE OUTCOME IN SEGMENT 1 | 50 - (SUM OF PAYOUTS PROVI DED DURING SEGMENT 1) |
| R700B-5 | OUTCOME C DURING SEGMENT 2 | 40 |
| | LAST POSSIBLE OUTCOME IN SEGMENT 2 | 100 - (SUM OF PAYOUTS PROVI DED DURING SEGMENT 2) |

FIG. 7B 70 0C

| Row | OUTCOME 70 5C | PAYOUT 71 0C |
|---|---|---|
| R700C-1 | LEMON - LEMON - PLUM | 0 |
| R700C-2 | LEMON - LEMON - LEMON | 5 |
| R700C-3 | BAR - BAR - BAR | 100 |
| R700C-4 | PAYBACK - PAYBACK - PAYBACK | SESSION LOSS AMOUNT |
| R700C-5 | PAYBA CK+3 - PAYBACK+5 - PAYBACK+2 | (SESSION LOSS AM OUNT) + 10 CREDITS |
| R700C-6 | 50%REFUND - 50%REF UND - 50%REFUND | (SESSION LOSS AMOUNT) / 2 |
| R700C-7 | RESET - RE SET - RESET | SET BALA NCE TO TOTAL BUY-IN |

FIG. 7C

800A

| | SESSION ID 805A | PLAYER ID 810A | SESSION STATUS 815A | OUTCOME 820A | OUTCOME TYPE 825A | PAYOUT 830A |
|---|---|---|---|---|---|---|
| R800A-1 | S-000001 | P-000345 | INACTIVE | PLUM-PLUM-PLUM | INDEPENDENT | 3 |
| | ∘ | ∘ | ∘ | LEMON-LEMON-LEMON | INDEPENDENT | 5 |
| | ∘ | ∘ | ∘ | BAR-BAR-BAR | INDEPENDENT | 77 |
| | ∘ | ∘ | ∘ | ∘ ∘ ∘ | ∘ ∘ ∘ | ∘ ∘ ∘ |
| R800A-2 | S-000153 | P-000001 | ACTIVE | CHERRY-CHERRY-LEMON | INDEPENDENT | 10 |
| | | | | LEMON-LEMON-LEMON | INDEPENDENT | 5 |
| | | | | BAR-BAR-BAR | DEPENDENT | 173 |
| | | | | WILD-WILD-WILD | DEPENDENT | 55 |

FIG. 8A

800B

| | SESSION ID 810B | PLAYER IDE NTIFIER 815B | TOTAL BUY- IN 820B | CURRE NT BAL ANCE 825B | SESS ION LOSS AMOUNT 830B |
|---|---|---|---|---|---|
| R800B-1 | S-000001 | P-106998 | 80 | 47 | 33 |
| R800B-2 | S-000002 | P-107506 | 400 | 382 | 18 |
| R800B-3 | S-000003 | P-022653 | 120 | 185 | 0 |
| | ooo | ooo | ooo | ooo | ooo |
| R800B-4 | S-000153 | P-018777 | 200 | 81 | 119 |

FIG. 8B

900

| | PLAYER ID 905 | NA ME 910 | AD DRESS 915 | SESSION ID(S) 920 |
|---|---|---|---|---|
| R900-1 | P-000001 | BOB JONES | 15 E LM ST. TOW N, NY | S-000153 |
| R900-2 | P-000002 | SUE DAVIS | 35 MAI N ST. CIT Y, CA | S-000807, S000745, S-001564 |
| | ∘∘∘ | ∘∘∘ | ∘∘∘ | ∘∘∘ |
| R900-3 | P-106998 | CHARLES WILLI AMS | 100 PLAI NS RD. RURA LVILLE, ND | S-000580 |
| R900-4 | P-106999 | MARY BR OWN | 65 BEACH ST. BEACH CITY, NJ | S-000605, S-000337 |

FIG. 9

APPARATUS, SYSTEMS AND METHODS FOR FACILITATING A PAYOUT OF A GAMING DEVICE

The present application claims the benefit of the following two provisional applications:

(i) U.S. Provisional Application No. 60/565,301, filed Apr. 26, 2004 in the name of Walker et al. and entitled APPARATUS, SYSTEMS AND METHODS FOR DETERMINING GAMING DEVICE PAYOUTS; and (ii) U.S. Provisional Application No. 60/576,255, filed Jun. 2, 2004 in the name of Walker et al. and entitled GAMING DEVICE WITH BALANCE RESET FEATURE.

The entirety of each of the above applications is incorporated by reference herein for all purposes.

The present application is also related to U.S. patent application Ser. No. 11/568,350 entitled "APPARATUS, SYSTEMS AND METHODS FOR FACILITATING A PAYOUT OF A GAMING DEVICE", filed on Apr. 25, 2005 as PCT Application Serial No. US2005/014046, and published on Nov. 10, 2005 as International Publication No. WO2005/05236.

BRIEF DESCRIPTION OF THE FIGURES

The accompanying drawings, which are incorporated in and constitute a part of this specification, illustrate some embodiments of the invention, and together with the description serve to explain the principles of some embodiments of the invention:

FIG. 6 is an example tabular representation of an example probability database, in accordance with an embodiment described herein;

FIG. 7A is an example tabular representation of an example payout database, in accordance with an embodiment described herein;

FIG. 7B is an example tabular representation of an example payout database, in accordance with an embodiment described herein;

FIG. 7C is an example tabular representation of an example payout database, in accordance with an embodiment described herein;

FIG. 8A is an example tabular representation of an example session database, in accordance with an embodiment described herein;

FIG. 8B is an example tabular representation of an example session database, in accordance with an embodiment described herein;

FIG. 9 is an example tabular representation of a player database, in accordance with an embodiment described herein;

FIGS. 11A and 111B are a flowchart illustrating an example process consistent with one or more embodiments described herein.

DETAILED DESCRIPTION

Figure 1:
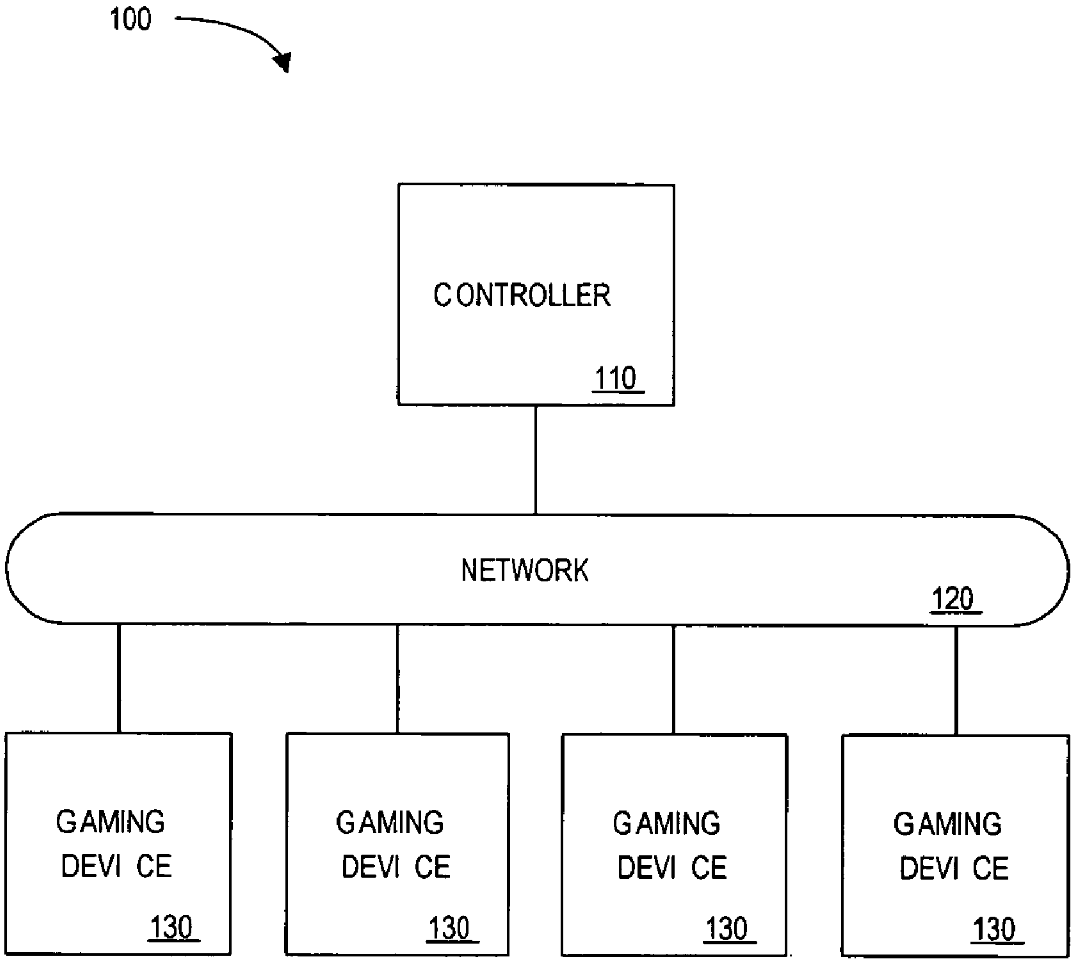
FIG. 1 is a block diagram of an example system that may be utilized to implement one or more embodiments described herein.

Applicants have recognized that a player of a gaming device would be encouraged to continue playing the gaming device and/or return to playing a gaming device if events during play of the gaming device affected payouts achievable by the player. This would result in a player feeling a sense of equity in the gaming device and thus a desire to continue playing the gaming device to reap the benefits of the equity.

Applicants have further recognized that a player of a gaming device would be encouraged to continue playing a gaming device even after sustaining losses at the gaming device if there was an opportunity for the player to recoup all or a part of his losses and/or if there was an opportunity for the player to effectively "go back in time" and have his credit meter balance reset to reflect the total buy-in amount the player has invested in the play session.

Applicants have still further recognized that in some games it may be advantageous to determine maximum payouts to be provided for respective segments of the game. In such games, Applicants have recognized that in some circumstances it may not be desirable to wait until an end of a game segment to provide the maximum payout but rather to output portions of the maximum payout for events that occur during the segment. Thus, in such embodiments Applicants have recognized that it may be desirable to track any payouts that are provided throughout a given segment, to ensure that at the end of the segment the sum of all payouts provided does not exceed the maximum payout and/or to ensure that the final payout for the segment is the result of the maximum payout less the sum of all payouts provided throughout the segment. This may be done to control the risk to a casino or other entity administering the game and providing the payouts for the game. Further, this may be an efficient method to determine desirable maximum payouts only for each segment of a game rather than for the multitude of payout triggering events that may comprise each segment.

In accordance with one embodiment, a method provides for determining an initiation of a game play on a gaming device, thereby determining a current game play. The method further provides for determining an outcome for the current game play based on a random number. The method further provides for determining that the outcome corresponds to a payout of a magnitude which was not displayed prior to the outcome of the current game play being determined and determining the magnitude of the payout based on at least one event associated with a game play that occurred prior to the current game play.

In accordance with one embodiment, a method provides for determining, based on a first random number, an outcome for a first game play conducted at a gaming device, thereby determining a first outcome. The first game play is a game play initiated in response to receiving, from a player, a first initiation signal and a first wager. The method further provides for determining an amount to be output as a result of the first outcome, thereby determining a first payout. The first payout is based on a probability of obtaining the first outcome and the first wager. The method still further provides for determining, based on a second random number, an outcome for a second game play conducted at the gaming device, thereby determining a second outcome. The second game play is a game play initiated in response to receiving, from the player, a second initiation signal and a second wager. The method also provides for determining an amount to be output as a result of the second outcome, thereby determining a second payout. The second payout is based on the first payout.

In accordance with one embodiment, a method provides for determining that a qualifying outcome has been obtained as a result of a game play conducted on a gaming device and determining a buy-in amount for a current play session in which the game play is included. The method further provides for setting, in response to the obtainment of the qualifying outcome, a credit meter balance to the buy-in amount, thereby providing a payout for the qualifying outcome.

Prior to a further detailed description of embodiments with respect to the figures, various terms and concepts used herein are described below.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. Those skilled in the art will recognize that the disclosed invention(s) may be practiced with various modifications and alterations. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Neither the Title (set forth at the beginning of the first page of this patent application) nor the Abstract (set forth at the end of this patent application) is to be taken as limiting in any way as the scope of the disclosed invention(s).

The terms "an embodiment", "embodiment", "embodiments", "the embodiment", "the embodiments", "one or more embodiments", "some embodiments", "one embodiment" and the like mean "one or more (but not all) embodiments of the disclosed invention(s)", unless expressly specified otherwise.

The terms "including", "comprising" and variations thereof mean "including but not limited to", unless expressly specified otherwise.

The enumerated listing of items (which may or may not be numbered) does not imply that any or all of the items are mutually exclusive, unless expressly specified otherwise. Likewise, the enumerated listing of items (which may or may not be numbered) does not imply that the items are comprehensive of any category, unless expressly specified otherwise.

The terms "a", "an" and "the" mean "one or more", unless expressly specified otherwise.

The terms "plurality" mean "two or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention(s).

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Each process/method includes one or more steps, and therefore a reference to a "step" of a method has an inherent antecedent basis.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media in a number of well-known manners. In some embodiments, hard-wired circuitry or custom hardware may be used in place of, or in combination with, software instructions for implementation of the processes of the present invention. Thus, embodiments are not limited to any specific combination of hardware and software.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G. In another example, instructions may initially be borne on a magnetic disk of a remote computer. The remote computer can load the instructions into its dynamic memory and send the instructions over a telephone line using a modem. A modem local to another device to which the instructions are being sent can receive the data on the telephone line and use an infrared transmitter to convert the data to an infrared signal. An infrared detector can receive the data carried in the infrared signal and place the data on a system bus for a processor of the device receiving the data. The system bus carries the data to main memory, from which the processor retrieves and executes the instructions. The instructions received by main memory may optionally be stored in a memory either before or after execution by the processor. In addition, instructions may be received via a communication port as electrical, electromagnetic or optical signals, which are exemplary forms of carrier waves that carry data streams representing various types of information. Thus, a device may obtain instructions in the form of a carrier wave.

Where databases are described, it will be understood by one of ordinary skill in the art that (i) alternative database structures to those described may be readily employed, and (ii) other memory structures besides databases may be readily employed.

The terms "buy-in" and "buy-in amount" are used interchangeably herein and may refer, unless specified otherwise, to an amount of currency or number of credits deposited by a player into a gaming device. The term "initial buy-in" (i.e., initial balance) may describe an amount of currency or credits first deposited by a player upon approaching a gaming device (e.g., a player approaches a slot machine and inserts a $20 bill). The term "total buy-in" may describe a total amount of currency or credits deposited by a player during a gaming session (e.g., if a player deposits 20 credits, plays for a period of time, then inserts 15 more credits, the total buy-in is 35 credits).

The terms "cash out" and "cashout" are used interchangeable herein and may refer to a process by which a player of a gaming device is provided with payment. Such payment is typically provided by the gaming device, e.g., in the form of coins, tokens, transfer of finds to an account associated with a player or a cashless gaming ticket.

The terms "cashless gaming ticket", "ticket" and "cashless gaming receipt" are used interchangeably herein and may refer, unless explicitly indicated otherwise, to a physical instrument (e.g., a small piece of paper) receivable by a gaming device (e.g., via a "ticket-in/ticket-out" device), comprising machine-readable indicia (e.g., a bar code) and a unique ticket identifier (e.g., a series of numeric digits). A cashless gaming ticket may entitle its bearer to a number of casino credits, currency and/or merchant credits equal to an indicated face value.

The terms "controller", "central controller", "slot server", "computer server", "computer server device" and "server device" are used interchangeable herein and may refer, unless specified otherwise, to one or more electronic devices (e.g., a computer, two distinct servers) that are operable to communicate with one or more gaming devices. A controller may manage, direct or otherwise affect the gaming devices, such as by providing a random number to a gaming device, by receiving and/or providing data associated with a player, and/or receiving and/or providing data associated with game play of the gaming device. A controller may also contain or otherwise be configured to read data from and/or write data to one or more (local or remote) databases regarding, among other things, data associated with (i) a cash-out ticket, (i) a supplemental ticket, (ii) a player, (iii) a payout, (iv) a probability of obtaining an outcome, etc.

The terms "credit balance", as used herein unless specified otherwise, may refer to an indication of an amount of currency (or other value) that is due to a player and/or that is available for wagering (e.g., a wager may be drawn from a credit balance). In some embodiments, a balance may be associated with a gaming device being operated by a player. Such an indication may be output via a gaming device display, such as an LED "credit meter." In some embodiments, a player wishing to cash out is provided with payment (e.g., a cashless gaming ticket) equal to his credit balance, or otherwise based on his credit balance (e.g., the integer amount of a credit balance, such as $5.00 for a balance of $5.50).

The term "game", as used herein unless specified otherwise, may refer to a wagering activity whereby a player posts consideration, usually monetary in form, in exchange for a chance at winning a payout (which is typically a monetary payout). The definition is intended to include basic games and bonus games. The definition is further intended to include both primary games and secondary games.

The terms "game device", "gaming device", "game machine", "gaming machine" are used interchangeable herein and may refer, unless specified otherwise, to any electrical, electromechanical and/or mechanical device that (in a manner well known in the art) accepts wagers, determines an outcome and pays winnings (if any) based on the outcome. The outcome may be randomly generated (as with a slot machine); may be generated through a combination of randomness and player skill (as with video poker); or may be generated entirely through player skill. Gaming devices may include slot machines (both video and mechanical reel slot machines), video poker machines, video blackjack machines, video roulette machines, video keno machines, video bingo machines, pachinko machines, video lottery terminals, handheld gaming devices, and the like.

The term "game play" may refer, unless specified otherwise, to a single play of a game at a gaming device that generates a singular, corresponding outcome (e.g., a player pulls the handle of a slot machine and the reels resolve to "Bar-Bar-Bar"). In one embodiment, a player wagers a number of credits in accordance with each game play. In some embodiments, one or more game plays may be associated with a particular cashless gaming receipt. For example, (i) the wagered credits of a game play may be derived from a balance credits generated by an inserted receipt, or (ii) a game play may occur during a session initiated by a receipt.

The terms "game session", "gaming session", "session" and "play session" are used interchangeably and may refer, unless specified otherwise, to a gambling event with a beginning and end that may encompass a number of game plays. The end of the session may be determined voluntarily (in which the player elects to stop play) or involuntarily (in which the gaming device terminates play). In some embodiments, a game session may be associated with a particular cashless gaming receipt and/or a player tracking card. For example, a session may begin when a player inserts a particular cashless gaming receipt, and end when the player cashes out. A number of game plays played consecutively by a gaming device player may comprise a game session. In some embodiments, a session may begin when a player inserts a player tracking card or otherwise provides a player identifier (e.g., enters a PIN code, provides a biometric identifier, etc.). In other embodiments, a player may pre-pay a fixed price for a game session comprising a predetermined length of time (e.g., 10 minutes), number of game plays (e.g., 100 spins) or some other measure (e.g., four laps of a race, a drive of a football game, an episode of Happy Days™, etc.).

The term "outcome", unless explicitly indicated otherwise, may refer to a result of one or more game plays and may comprise at least one game indicium that indicates the result. For example, a handle of a three-reel slot machine is pulled, and the reels resolve to an outcome of "Plum-Orange-Orange." An outcome may correspond to a payout amount as detailed further herein.

The term "reset outcome" may refer, unless expressly indicated otherwise, to an outcome that causes a payout to be provided, wherein the payout is based on a balance such as a credit meter balance or another monetary balance (e.g., a balance of funds associated with a smart card).

The payout of a reset outcome being based on a balance may, in one embodiment, mean that the payout is determined to be an amount that, when added to the current balance, causes the balance to be reset to an amount at which it was set at a prior time. In another embodiment, the payout of a reset outcome being based on a balance may mean that a balance of losses (e.g., the sum of wagers lost by a player during a play session) is tracked and the payout is determined to be all or a portion of the losses.

For example, the payout of a reset outcome may be based on a buy-in amount, a loss amount and/or a current gaming device balance (e.g., "Payback-Payback-Payback" refunds a number of coins lost during a particular slot machine gaming session; "Reset-Reset-Reset" resets credit meter balance to buy-in amount for the session; a "straight flush" refunds coins lost while playing a video poker game).

In another example, the payout of a reset outcome may be based on a peak or highest credit meter balance achieved thus far in a specified period of time (e.g., during a current play session). Thus, in a more particular example, if the highest credit meter balance achieved during a current play session was 150 credits and the credit meter balance at the time a reset outcome is achieved is 100 credits, the payout for the reset outcome may be determined to be 50 credits, thus causing the credit meter balance to be reset to the 150 credits.

The term "parameter" may refer, unless specified otherwise, to an attribute associated with a gaming device, game play, play session and/or period of time. A parameter may have a range of available values associated therewith, a particular one of the values from the range of values being selected in response to one or more events. In one embodiment, an event that may cause a selection of a value from the range of values available for a ticket, where the selection is based on a parameter.

The terms "payout" and "payout amount" are used interchangeably herein and may refer, unless explicitly indicated otherwise, to a benefit that may be provided (e.g., to a player) as the result of an outcome (e.g., at the end of a bonus round, a player is paid 120 credits). For example, in some embodiments, a payout comprises a number of credits added to a balance represented by an electronic credit meter (e.g., a winning outcome of "Lemon-Lemon-Lemon" pays five credits). In one embodiment, as described in detail herein, a payout amount may be based at least in part on another payout amount.

Regarding player tracking cards and player tracking systems, most casinos issue plastic cards (typically resembling frequent shopper cards) to players as a way of identifying the player at a slot machine or table game. As is well known in the art, such cards typically have encoded thereon (e.g., in machine-readable and/or human readable form) a player identifier (e.g., a six digit number) which uniquely identifies the player (e.g., because the number is associated with a record in a player database that includes corresponding player information). At a slot machine or other device, the player inserts the card into a corresponding reader device and the player identifier is read (e.g., magnetically or optically) from the card. From the player identifier which the reader device reads, the corresponding player information may in turn be determined (e.g., read from the database, typically via a network connection between the reader device and a device hosting the database). In some embodiments, a player tracking card may comprise a "smart card," as described further herein.

Provided below are two examples of implementations of embodiments described herein. The examples are described from a player's perspective, to highlight how embodiments of the present invention may encourage a player to continue playing a gaming device (e.g., by promoting a sense of equity in the player for the gaming device).

EXAMPLE 1

Mike approaches a football-themed "Touchdown Drive" slot machine. The machine has two display screens, the bottom screen comprising three video reels. Mike pays a flat rate of 40 credits for a game session in which he'll attempt to score points as the offense of an animated football team.

Mike spins the reels. On his first spin, he gets an outcome of "1-2-1," advancing his team a total of four yards. Mike continues to play, noticing that six credits are added to his credit meter each time he gets a first down. After getting a total of four first downs (netting Mike 24 credits), Mike spins and the reels resolve to "Touchdown-Touchdown-Touchdown."

Mike views an animated character score a touchdown on the upper display screen. The display screen then reads: "Touchdown! You win a 76 credit bonus!" Mike is excited to have scored a touchdown, and he applauds as his credit meter increases from 24 to 100 (reflecting the addition of the 76-credit touchdown bonus). In one embodiment, an explanation of how the 76 credit bonus was calculated may also be output to Mike (e.g., "Your bonus is the amount of credits you need to bring you up to the maximum obtainable win for this session, which is 100 credits (100 credits−the 24 credits you already won during the session=76 credits)!"). Mike's session ends, and he walks away happy, having won a net of 60 credits (100 credits at the end of the session−40 credits paid for the session=60 credit net win for the session).

EXAMPLE 2

Fred approaches a three-reel "Wild Bonus" slot machine and inserts his player tracking card. During the first 15 minutes of play, Fred hits a number of payouts for various winning outcomes, including 20 credits for "Banana-Banana-Banana."

Fred spins and watches the reels resolve to "Wild-Wild-Wild"; realizing this means he could be in for a large payout, Fred's excitement grows. He shifts his attention to the machine's upper display screen, which presents an animated "Wild Bonus" sequence.

During the sequence, an animated bonus wheel spins, and ultimately stops on "200 credits." However, immediately after the 200-credit bonus payout is revealed, an animated "Taxman" character appears. As the display screen reads "The Taxman steals your last payout!", the bonus payout amount is decreased to 180 credits, to reflect the subtraction of 20 credits.

Fred is excited having won the big payout, and hopes that next time he can avoid the Taxman character. Sure enough, a few spins later, he hits the bonus again. This time, the bonus wheel spins and lands on "Double your last bonus payout!" Fred is ecstatic having won 360 credits (180×2), and is even more satisfied when, this time, the Taxman doesn't show up to steal some of his payout.

It should be understood that the embodiments described above are not meant to be limiting in any sense, and various modifications of the described embodiments and additional embodiments are within the scope of the present invention. Some example modified and additional embodiments will now be described. Also provided below is additional description and/or clarification of already described embodiments.

Referring now to FIG. 1, illustrated therein is a block diagram of an example system 100 that may be utilized to implement some embodiments of the present invention. The system 100 includes a controller 110 (e.g., a slot server of a casino, a controller of a plurality of gaming devices) that is operable to communicate, via a communications network 120, with one or more gaming devices 130 (e.g., slot machines, video poker machines). The controller 110 may communicate with the devices 130 directly or indirectly, via a wired or wireless medium such as the Internet, LAN, WAN or Ethernet, Token Ring, or via any appropriate communications means or combination of communications means. Each of the devices 130 may comprise computers, such as those based on the Intel® Pentium® processor, that are adapted to communicate with the controller 110. Any number and type of devices 130 may be in communication with the controller 110.

Communication between the devices 130 and the controller 110, and among the devices 130, may be direct or indirect, such as over the Internet through a Web site maintained by controller 110 on a remote server or over an on-line data network including commercial on-line service providers, bulletin board systems and the like. In yet other embodiments, the devices 130 may communicate with one another and/or controller 110 over RF, cable TV, satellite links and the like.

Some, but not all, possible communication networks that may comprise the network 120 or be otherwise part of the system 100 include: a local area network (LAN), a wide area network (WAN), the Internet, a telephone line, a cable line, a radio channel, an optical communications line, and a satellite communications link. A variety of communications protocols may be part of the system, including but not limited to: Ethernet (or IEEE 802.3), SAP, SAS™, ATP, Bluetooth™, and TCP/IP. Further, in some embodiments, various communications protocols endorsed by the Gaming Standards Association of Fremont, Calif., may be utilized, such as (i) the Gaming-Device Standard (GDS), which may facilitate communication between a gaming device and various component devices and/or peripheral devices (e.g., printers, bill acceptors, etc.); (ii) the Best of Breed (BOB) standard, which may facilitate communication between a gaming device and various servers related to play of one or more gaming devices (e.g., servers that assist in providing accounting, player tracking, ticket-in/ticket-out and progressive jackpot functionality); and/or (iii) the System-to-System (S2S) standard, which may facilitate communication between game-related servers and/or casino property management servers (e.g., a hotel server comprising one or more databases that store information about booking and reservations).

Communication among devices may be encrypted to ensure privacy and prevent fraud in any of a variety of ways well known in the art.

In an embodiment, the controller 110 may not be necessary and/or preferred. For example, the present invention may, in one or more embodiments, be practiced on a stand-alone gaming device 130 and/or a gaming device 130 in communication only with one or more other gaming devices 130. In such an embodiment, any functions described as performed by the controller 110 or data described as stored on the controller 110 may instead be performed by or stored on one or more gaming devices 130.

In one embodiment, system 100 may be modified such that at least one gaming device 130 is also in communication with one or more peripheral devices. A peripheral device may, in turn, be in communication with a peripheral device server and, in some embodiments, with controller 110. In one or more embodiments the peripheral device server may be in communication with one or more gaming devices 130 and/or controller 110. A peripheral device may be a device that receives information from (and/or transmits information to) one or more gaming devices 130 (e.g., via a processor of the one or more gaming devices 130). For example, a peripheral device may be operable to receive information about games being played on a gaming device 130, such as an indication of an initiation of a game, an outcome obtained as a result of a game play, a payout provided as a result of an outcome, and/or a random number that has been generated for a game play. In one embodiment, a peripheral device may be associated or include a processor that is distinct from a processor of a gaming device 130 with which the peripheral device 140 is associated.

In one or more embodiments, a peripheral device may be useful for implementing the embodiments of the present invention into the operation of a conventional gaming device. For example, an external or internal module that comprises a peripheral device may be inserted in, attached to or otherwise associated with a gaming device 130 and may function to (i) receive data associated with an outcome and/or a payout; (ii) direct the associated gaming device 130 to perform one or more functions associated with an outcome and/or a payout; and/or (iii) output a payout, bonus or other benefit.

Accordingly, a peripheral device may include (i) a communications port (e.g., for communicating with one or more gaming devices 130, peripheral device server, another peripheral device, and/or controller 110); (ii) a display (e.g., for displaying messages and/or benefits made available to a player as a result of obtaining an outcome), (iii) another output means (e.g., a speaker, light, or motion device to communicate with a player), and/or (iv) a benefit providing means (e.g., a printer and paper dispensing means, a credit meter, and/or a hopper and hopper controller).

In one or more embodiments, the peripheral device may not output messages or other information to a player but may instead direct a processor of a gaming device 130 to perform such functions. For example, a program stored in a memory of peripheral device may cause a processor of a gaming device 130 to perform certain functions. For example, a program stored in a memory of peripheral device may cause a processor of a gaming device 130 to add credits to a credit meter balance beyond a number of credits associated with an outcome in a payout table stored in the memory of the gaming device.

In one or more embodiments, devices other than a peripheral device and/or a peripheral device server and in addition to those illustrated in FIG. 1 may be included in a system utilized to implement embodiments described herein. For example, a kiosk may be included as part of system 100, the kiosk operable to output and/or receive information about payouts and/or outcomes. In some embodiments, a kiosk may comprise a processor and a memory as described. A kiosk may also comprise various input devices (e.g., a keypad, a keyboard, a mouse, buttons, a port that receives player tracking cards, an optical scanner for reading barcodes or other indicia, a CCD camera, etc.), output devices (e.g., a display screen, audio speakers, etc.), benefit output devices (e.g., a coin tray or printer for printing cashless gaming tickets), combinations thereof (e.g., a "ticket-in/ticket-out" device, a touch-sensitive display screen, etc.), communications ports, and so on. Thus, a kiosk may comprise many of the features and components of a gaming device, though the kiosk itself may not necessarily be configured to enable gambling activity as a primary function. A kiosk may communicate with any or all of (i) a controller, (ii) a gaming device, (iii) an inventory/reservation system of a casino-maintained property (e.g., a hotel), (iv) casino personnel devices, (v) merchant POS terminals, and so on. A number of kiosks may be stationed within casino premises (e.g., at various locations on a slot floor). In various embodiments, kiosks may execute or assist in the execution of (i) determining and outputting a player status or other types of data described herein (e.g., a kiosk receives a player tracking card, and outputs a number of accumulated reward which a player may be entitled to redeem), (ii) outputting payments to players (e.g., upon receipt of cash-out tickets, player tracking cards, smart cards, etc.), and/or (iii) any other process described herein. Thus, such a device may be configured to read from and/or write to one or more databases of the present invention. The memory of such a device may store a program for executing such processes.

In some embodiments, various casino employees may be equipped with or otherwise utilize one or more casino personnel devices, such as personal digital assistants (PDAs) or other computing devices (e.g., personal computer terminals). A casino personnel device may comprise various input devices (e.g., a keypad, a touch-sensitive display screen, a card reader, an infrared bar code scanner, etc.), various output devices (e.g., an LCD screen), a processor, a memory and/or a communications port, as described herein with respect to other devices. In some embodiments, a casino personnel device may communicate with a gaming device, controller, kiosk, peripheral device, and/or an inventory/reservation system of a casino-maintained property (e.g., a hotel). Thus, a casino personnel device may be configurable to, among other things, (i) read from and/or write to one or more databases described herein, (ii) assist in payments made to players (e.g., a representative "scans" a cashless gaming receipt and determines a value associated with the receipt, and if the receipt is valid, provides payment equal to the value), and/or (iii) execute or assist in the execution of various other processes described herein. The memory of such a device may store a program for executing such processes.

In some embodiments, various merchants (e.g., shops, restaurants, etc.) may utilize point-of-sale (POS) computer terminals to facilitate various processes of the present invention. For example, in some embodiments, a player may receive a cashless gaming ticket redeemable for an amount of currency. However, the ticket may alternately or additionally be redeemable for an amount of credit at a particular merchant location. Thus, in some embodiments, merchants may utilize POS terminals to redeem such vouchers. In some embodiments, such devices may be configured to read from and/or write to one or more databases of the present invention. Such POS terminals may thus comprise various hardware and software described herein with respect to other devices, and may communicate with (i) a central slot server, (ii) a gaming device, (iii) an inventory/reservation system (e.g., a computer terminal at a theatre communicates with an inventory database to determine a number of unsold seats for a certain event), (iv) a kiosk, and so on.

In some embodiments of the present invention, various component devices (e.g., any or all of the benefit output devices, output devices, input devices and/or input output devices described herein) may be embodied as peripheral devices. For example, such devices may not necessarily be components of a gaming device, though they may be configured in such a manner so as to communicate with one or more gaming device processors or any other devices described herein. For example, a peripheral device such as a large display device may be associated with a plurality of gaming devices, and thus may not necessarily be considered a component of any one gaming device. Further, in some embodiments, certain peripheral devices such as card readers may be interchangeable between gaming devices, and thus may be considered a component of a first gaming device while connected thereto, removed from the first gaming device, connected to a second gaming device, and so on. In other embodiments, various peripheral devices may never be considered a component of a particular gaming device. For example, in some embodiments, a peripheral device such as a USB-based portable memory device may store (i) one or more databases described herein, and/or (ii) a program for executing one or more process steps described herein. Such a peripheral device may then be utilized by casino personnel for upgrading/retrofitting existing gaming devices as described herein.

Figure 2:
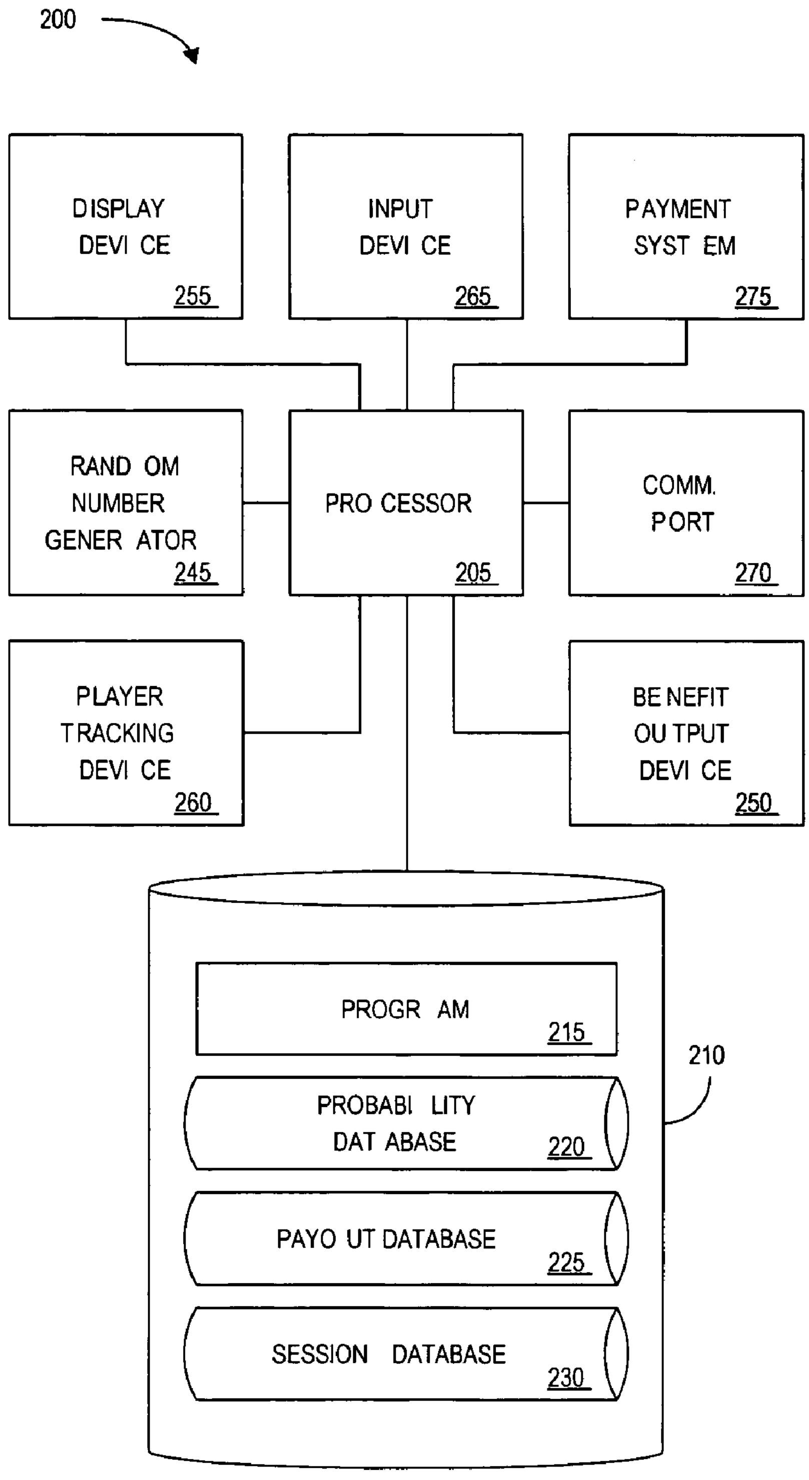
FIG. 2 is a block diagram of an example controller that may be utilized to implement one or more embodiments described herein.

Referring now to FIG. 2, illustrated therein in block diagram form is an example embodiment 200 of a gaming device that may be a gaming device 130. Embodiment 200 is referred to as gaming device 200 herein.

The gaming device 200 may be implemented as a system controller, a dedicated hardware circuit, an appropriately programmed general-purpose computer, or any other equivalent electronic, mechanical or electro-mechanical device. The gaming device 200 may comprise, for example, a slot machine, a video poker terminal, a video blackjack terminal, a video keno terminal, a video lottery terminal, a pachinko machine or a table-top game (e.g., a mechanical or electro-mechanical device may be associated with a table game and be operable to output and/or redeem supplemental tickets).

In various embodiments, a gaming device may comprise, for example, a personal computer (e.g., which communicates with an online casino Web site), a telephone (e.g., to communicate with an automated sports book that provides gaming services), or a portable handheld gaming device (e.g., a personal digital assistant, Nintendo GameBoy or Sony PSP). In some embodiments, a user device such as a PDA or cell phone may be used in place of, or in addition to, some or all of the gaming device 200 components depicted in FIG. 2. Further, a gaming device may comprise a personal computer or other device operable to communicate with an online casino and facilitate game play at the online casino. In one or more embodiments, the gaming device 200 may comprise a computing device operable to execute software that simulates play of a reeled slot machine game, video poker game, video blackjack game, video keno game, video roulette game, or lottery game.

It should be noted that not all of the components described herein as being components of gaming device 200 may be necessary and/or preferred for a gaming device operable to implement embodiments described herein. For example, in embodiments in which a gaming device comprises a personal computer operable to access an online casino, a random number generator may not be a component of the gaming device but may rather be a component of a server administering the online casino. In another example, a gaming device that comprises a personal computer may not necessarily include a benefit output device and/or a player-tracking device.

The gaming device 200 comprises a processor 205, such as one or more Intel® Pentium® processors. The processor 205 is in communication with a memory 210 and a communications port 270 (e.g., for communicating with one or more other devices). The memory 210 may comprise an appropriate combination of magnetic, optical and/or semiconductor memory, and may include, for example, Random Access Memory (RAM), Read-Only Memory (ROM), a compact disc and/or a hard disk. The memory 210 may comprise or include any type of computer-readable medium. The processor 205 and the memory 210 may each be, for example: (i) located entirely within a single computer or other device; or (ii) connected to each other by a remote communication medium, such as a serial port cable, telephone line or radio frequency transceiver. In one embodiment, the gaming device 200 may comprise one or more devices that are connected to a remote server computer for maintaining databases.

The memory 210 stores a program 215 for controlling the processor 205. The processor 205 performs instructions of the program 215, and thereby operates in accordance with the present invention, and particularly in accordance with the methods described in detail herein. The program 215 may be stored in a compressed, uncompiled and/or encrypted format. The program 215 furthermore includes program elements that may be necessary, such as an operating system, a database management system and "device drivers" for allowing the processor 205 to interface with computer peripheral devices. Appropriate program elements are known to those skilled in the art, and need not be described in detail herein.

According to an embodiment described herein, the instructions of the program 215 may be read into a main memory from another computer-readable medium, such as from a ROM to RAM. Execution of sequences of the instructions in program 215 causes processor 205 to perform the process steps described herein. In alternate embodiments, hard-wired circuitry may be used in place of, or in combination with, software instructions for implementation of the processes of the present invention. Thus, embodiments described herein are not limited to any specific combination of hardware and software. As discussed with respect to system 100 of FIG. 1, execution of sequences of the instructions in a program of a peripheral device 140 in communication with gaming device may also cause processor 205 to perform some of the process steps described herein.

The memory 210 also stores a plurality of databases, including a probability database 220, a payout database 223 and a session database 230. Each of these databases is described in detail below.

Note that, although databases 220, 225 and 230 are described as being stored in a gaming device, in other embodiments of the present invention some or all of these databases may be partially or wholly stored in another device, such as one or more peripheral devices, a peripheral device server and/or the controller 110. Further, some or all of the data described as being stored in the databases 220-230 may be partially or wholly stored (in addition to or in lieu of being stored in the memory 210 of the gaming device 200) in a memory of one or more other devices, such as one or more peripheral devices, another gaming device, a peripheral device server and/or the controller 110.

The databases 220, 225 and 230 are described in detail below and example structures are depicted with sample entries in the accompanying figures. As will be understood by those skilled in the art, the schematic illustrations and accompanying descriptions of the sample databases presented herein are exemplary arrangements for stored representations of information. Any number of other arrangements may be employed besides those suggested by the tables shown. For example, even though three separate databases are illustrated, the invention could be practiced effectively using one, two, four, five, or more functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention.

The processor 205 is also operable to communicate with a random number generator 245, which may be a component of gaming device 200. The random number generator, in accordance with at least one embodiment of the present invention, may generate data representing random or pseudo-random values (referred to as "random numbers" herein). The random number generator may generate a random number every predetermined unit of time (e.g., every second) and/or in response to an event such as an initiation of a game play on the gaming device or receipt of a signal from another device. In the former embodiment, the generated random numbers may be used as they are generated (e.g., the random number generated at substantially the time of game play initiation is used for that game play) and/or stored for future use. A random number generated by the random number generator may be used by the processor 205 to determine, for example, an outcome for a game play, a payout associated with an outcome, and/or which of a plurality of payouts to provide as the result of an outcome. For example, in one embodiment a formula for determining a payout that is based on a previously provided payout may define that the previously provided payout is to be multiplied by a multiplier a magnitude of which is to be determined based on a random number. The magnitude of the multiplier may be determined, for example, upon determining that a result of a game play is an outcome that corresponds to a payout to be determined based on the formula. Thus, a random number of random number generator 245 (or of another random number generator) may be utilized to determine the magnitude of the multiplier to be applied.

A random number generator, as used herein, may be embodied as a processor separate from but working in cooperation with processor 205. Alternatively, random number generator may be embodied as an algorithm, program component, or software stored in the memory of gaming device 200 and used to generate a random number.

Note that, although the generation or obtainment of a random number is described herein as involving a random number generator of a gaming device, other methods of determining a random number may be employed. For example, a gaming device owner or operator may obtain sets of random numbers that have been generated by another entity. HotBitS™, for example, is a service that provides random numbers that have been generated by timing successive pairs of radioactive decays detected by a Geiger-Muller tube interfaced to a computer. In another example, a blower mechanism that uses physical balls with numbers thereon may be used to determine a random number by randomly selecting one of the balls and determining the number thereof.

In yet another example, another device remote from the gaming device 200 (e.g., a controller 110) may include a random number generator that generates random numbers to be provided to the gaming device 200. For example, in some embodiments, a gaming device may receive random numbers and/or any other data related to the random or pseudo-random determination of an outcome from a separate device, such as a server. It should be noted that such embodiments may be advantageous in environments or jurisdictions wherein the “central determination” of outcomes is required by regulation or otherwise preferred.

The processor 205 is also operable to communicate with a benefit output device 250, which may be a component of gaming device 200. The benefit output device 250 may comprise one or more devices for outputting a benefit (e.g., a payout) to a player of the gaming device 200.

For example, in one embodiment the gaming device 200 may provide coins and/or tokens as a benefit. In such an embodiment the benefit output device 250 may comprise a hopper and hopper controller, for dispensing coins and/or tokens into a coin tray of the gaming device 300.

In another example, the gaming device 200 may provide a receipt or other document on which there is printed an indication of a benefit. For example, the gaming device may be operable to output one or more cash-out tickets. In such an embodiment the benefit output device 250 may comprise a printing mechanism and a document dispensing mechanism.

In yet another example, the gaming device 200 may provide electronic credits as a benefit (which, e.g., may be subsequently converted to coins and/or tokens and dispensed from a hopper into a coin tray). In such an embodiment the benefit output device 250 may comprise a credit meter balance and/or a processor that manages the amount of electronic credits that is indicated on a display of a credit meter balance. The processor may be the processor 205 or another processor.

In yet another example, the gaming device 200 may credit a monetary amount to a financial account associated with a player as a benefit provided to a player. The financial account may be, for example, a credit card account, a debit account, a charge account, a checking account, or a casino account. In such an embodiment the benefit output device 250 may comprise a device for communicating with a server on which the financial account is maintained.

Note that, in one or more embodiments, the gaming device 200 may include more than one benefit output device 250 even though only one benefit output device is illustrated in FIG. 2. For example, the gaming device 200 may include each of (i) a hopper and hopper controller combination, (ii) a credit meter balance, and (iii) a document printing and dispensing combination. Such a gaming device may be operable to provide more than one type of benefit to a player of the gaming device.

A single benefit output device 250 may be operable to output more than one type of benefit. For example, a benefit output device 250 may be operable to increase the balance of credits in a credit meter and communicate with a remote device in order to increase the balance of a financial account associated with a player.

The processor 205 is also operable to communicate with a display device 255, which may be a component of gaming device 200. The display device 255 may comprise, for example, one or more display screens or areas for outputting information related to game play on the gaming device, such as a cathode ray tube (CRT) monitor, liquid crystal display (LCD) screen, or light emitting diode (LED) screen.

In one or more embodiments, gaming device 200 may comprise more than one display device. For example, gaming device 200 may comprise an LCD display for displaying electronic reels, a display area that displays rotating mechanical reels, and an LED display of a player tracking device (e.g., such as player tracking device 260, described below) that outputs information to a player.

The processor 205 may also be in communication with one or more other devices besides the display device 255, for outputting information (e.g., to a player or another device). Such other one or more output devices may also be components of gaming device 200. Such other one or more output devices may comprise, for example, an audio speaker (e.g., for outputting an actual and/or apparent outcome or information related thereto, in addition to or in lieu of such information being output via a display device 255), an infra-red transmitter, a radio transmitter, an electric motor, a printer (e.g., such as for printing cashless gaming vouchers), a ticket or product dispenser, an infra-red port (e.g., for communicating with a second gaming device or a portable device of a player), a Braille computer monitor, and a coin or bill dispenser. For gaming devices, common output devices include a cathode ray tube (CRT) monitor on a video poker machine, a bell on a gaming device (e.g., rings when a player wins), an LED display of a player's credit balance on a gaming device, an LCD display of a personal digital assistant (PDA) for displaying keno numbers.

The display device 255 may comprise, for example, one or more display areas. For example, one of the display areas may display outcomes of games played on the gaming device (e.g., electronic reels of a gaming device). Another of the display areas may display rules for playing a game of the gaming device. Yet another of the display areas may display the benefits obtainable by playing a game of the gaming device (e.g., in the form of a payout table). Yet another of the display area may display information describing a benefit associated with a supplemental ticket to be provided, being provided, having been provided or being redeemed by a player. For example, a display area may output a message that indicates an extra number of credits that is being provided to the player as a result of the player redeeming a supplemental ticket along with a cash-out ticket. In one or more embodiments, the gaming device 200 may include more than one display device, one or more other output devices, or a combination thereof (e.g., two display devices and two audio speakers).

The processor 205 is also in communication with an input device 265, which is a device that is capable of receiving an input (e.g., from a player or another device, such as an indicium associated with play of a gaming device) and which may be a component of gaming device 200. An input device may communicate with or be part of another device (e.g. a server, a gaming device, etc.). Some examples of input devices include: a bar-code scanner, an optical scanner configured to read other indicia of a voucher or cashless gaming ticket, a CCD camera, a magnetic stripe reader (e.g., for reading data encoded upon a player tracking card), a smart card reader (e.g., for reading data stored upon a smart card), a computer keyboard or keypad, a button, a handle, a lever, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port (e.g., for receiving communications from a second gaming device or from a another device such as a smart card or PDA of a player), and a weight scale. For gaming devices, common input devices include a button or touch screen on a video poker machine, a lever or handle connected to the gaming device, a magnetic stripe reader to read a player tracking card inserted into a gaming device, a touch screen for input of player selections during game play, a paper ticket acceptor for accepting paper tickets such as cash-out tickets and a coin and bill acceptor.

In some embodiments, a gaming device may comprise components capable of facilitating both input and output functions (i.e., input/output devices). In one example, a touch-sensitive display screen comprises an input/output device (e.g., the device outputs graphics and receives selections from players). In another example, a processor may communicate with a "ticket-in/ticket-out" device configured to dispense and receive cash-out tickets. Such a device may also assist in (e.g., provide data so as to facilitate) various accounting functions (e.g., ticket validation and redemption). For example, any or all of a gaming device, kiosk and casino personnel device maintained at a cashier cage may (i) comprise such a benefit input/output device, and/or (ii) communicate with a central server that manages the accounting associated with such ticket-in/ticket-out transactions (e.g., so as to track the issuance, redemption and expiration of such tickets). One example of ticket-in/ticket-out technology that may be adapted or utilized to implement embodiments described herein is the EZ Pay™ system, is manufactured by International Gaming Technology, headquartered in Reno, Nev.

Of course, as would be understood by one of ordinary skill in the art, a gaming device may comprise various combinations of such component devices. For example, in one or more embodiments, the gaming device may include more than one display device, one or more other output devices, several input devices, and so on (e.g., two display screens, two audio speakers, a ticket-in/ticket-out device and several buttons).

The processor 205 is also in communication with a payment system 275, which may be a component of gaming device 200. The payment system 275 is a device capable of accepting payment from a player (e.g., a bet or initiation of a balance) and/or providing payment to a player (e.g., a payout). Payment is not limited to money, but may also include other types of consideration, including products, services, and alternate currencies (e.g., casino tokens).

Exemplary methods of accepting payment by the payment system 275 include (i) receiving hard currency (i.e., coins or bills), and accordingly the payment system 275 may comprise a coin or bill acceptor; (ii) receiving an alternate currency (e.g., a cash-out ticket, a coupon, a non-negotiable token), and accordingly the payment system 275 may comprise a bar code reader or other sensing means; (iii) receiving a payment identifier (e.g., a credit card number, a debit card number, a player tracking card number, a code via a keypad or touch-screen); (iv) receiving a smart card having an indication of an amount of currency stored thereon; and (v) determining that a player has performed a value-added activity (e.g., participating in surveys, monitoring remote images for security purposes, referring friends to the casino).

The processor 205 is further operable to communicate with a player tracking device 260, which may be a component of gaming device 200. Player tracking device 260 may, in one or more embodiments, comprise a reader device operable to read information from and/or write information to a card such as a smart card and/or a player tracking card, such that (i) players may be identified, and (ii) various data associated with players may then be determined (e.g., a number of cashable credits; a number of promotional credits that may not be redeemed for cash; a code or other indication of a benefit to be provided to the player, a number of accumulated loyalty points; a number of accumulated game elements such as symbols, cards or hands; etc.). In one example, a card reader device may determine an identifier associated with a player (e.g., by reading a player tracking card comprising an encoded version of the identifier), such that the gaming device may then access data (e.g., of a player database, a session database) associated with the player. In another example, a smart card reader device may determine data associated with a player directly by accessing a memory of an inserted smart card.

As known in the art, "smart cards" may incorporate (i) a memory, and (ii) means for accessing such a memory. For example, in one embodiment, the memory may store data related to aspects of the present invention. In one embodiment, data may be written to the smart card as a player plays one or more gaming devices (e.g., such that various data may be updated on a continuous, periodic or event-triggered bases). Accordingly, in one or more embodiments one or more devices operable to carry out various processes of the present invention (e.g., a gaming device or kiosk) may have associated therewith a smart card reader device, such that data may be read from the smart card pursuant to the execution of such processes. An example of a smart card system that may be used to implement one or more embodiments of the present invention is the s-Choice™ Smart Card Casino Management System from Smart Card Integrators, Inc.™.

Further, as known in the art, a gaming device may comprise a player tracking module comprising (i) a card reader (e.g., a port into which player tracking cards may be inserted), (ii) various input devices (e.g., a keypad, a touch-screen), (iii) various output devices (e.g., a small, full-color display screen), and/or (iv) combinations thereof (e.g., a touch-sensitive display screen that accommodates both input and output functions). Various commercially available devices may be suitable for such an application, such as the NextGen™ interactive player tracking panel manufactured by IGT or the iVIEW display screen manufactured by Bally® Gaming and Systems.

Of course, other non-card-based methods of identifying players are contemplated. For example, a unique identification code may be associated with the player. The player may then be identified upon entering the code. For example, the code may be stored (e.g., within a database maintained within the gaming device and/or a server) such that the player may enter the code using an input device of a gaming device, and accordingly be identified. In other embodiments, player biometrics may serve as identification means (e.g., a player is identified via a thumbprint or retinal scan). In further embodiments, a barcode of a cashless gaming ticket may encode a player identifier.

Thus, as described, various data associated with a player may be tracked and stored (e.g., in an appropriate record of a centrally-maintained database), such that it may be accessed as desired (e.g., when determining promotional offers or rewards to be provided to players, when determining the status of player with respect to a particular game or period of gambling activity, and so on). Further, various statistics may be measured in association with a player (e.g., coin-in statistics, win/loss statistics, buy-in amount for a session) and similarly accessed.

Various systems for facilitating such monitoring are contemplated. For example, a two-wire system such as one offered by International Gaming Systems (IGT) may be used. Similarly, a protocol such as the IGT SAS™ protocol may be used. The SAS™ protocol allows for communication between gaming machines and slot accounting systems and provides a secure method of communicating all necessary data supplied by the gaming device to the online monitoring system. One aspect of the SAS™ protocol that may be beneficial in implementing aspects of the present invention is the authentication function which allows operators and regulators to remotely interrogate gaming devices for important memory verification information, for both game programs, and peripheral devices. In another example, a one-wire system such as the OASIS™ System offered by Aristocrat Technologies™ or the SDS slot-floor monitoring system offered by Bally Gaming and Systems™ may be used. Each of the systems described above is an integrated information system that continually monitors slot machines and customer gaming activity. Thus, for example, any one of these systems may be used to monitor a player's gaming activity in order to determine player outcomes, buy-in amounts, coin-in statistics, win/loss statistics and/or any other data deemed relevant.

In one embodiment, a player may operate a plurality of gaming devices. For example, a player may simultaneously play two side-by-side gaming devices, a player may play one gaming device (e.g. a gaming device) and then continue his gaming session at another gaming device (e.g. a video poker machine), and a player may remotely operate a gaming device, possibly by using a telephone, PDA or other device (i) to transmit commands (directly or indirectly) to the gaming device, such as wager amounts and commands to select certain cards; and/or (ii) to receive output (directly or indirectly) from the gaming device.

In one embodiment, a gaming device may allow a player to play a game of skill rather than a game of chance. Such an embodiment may be more appealing to certain players or may be permitted in areas where it is illegal to gamble on games of chance.

In one or more embodiments, aspects of the present invention, such as providing a payout the magnitude of which is based on a previously provided payout or a buy-in amount, may be practiced by replacing and/or augmenting one or more components (e.g., hardware and/or software components) of an existing gaming device. Thus, in one or more embodiments, the invention may be applied as a retrofit or upgrade to existing gaming devices currently available for play within various casinos.

For example, a memory (e.g., computer chip) of the gaming device may be replaced or added, the replacement or additional memory storing a program for instructing the processor of the gaming device to operate in accordance with one or more embodiments of the present invention. In another example, data output via the gaming device (e.g., graphical and/or textual data displayed on the gaming device) may be replaced or added, the replacement or additional data indicating to a player information relevant to one or more aspects of the present invention.

In a specific example, a gaming device may comprise various electronic components mounted to one or more printed circuit boards (PCBs). Such components may include various hardware described herein, such as a communications port and various controllers of peripheral devices (e.g., a display controller), as well as a memory for storing programming instructions (software) and a processor for carrying out such instructions. Forms of memory that may be found in a gaming device include electronically erasable programmable read-only memory (EEPROM), erasable programmable read-only memory (EPROM) and flash memory. Thus, in one or more embodiments of the present invention, an EPROM storing software with instructions for carrying out aspects of the present invention (as well as instructions for carrying out other functions traditionally performed by the gaming device) may replace an EPROM previously installed in a gaming device or may be reprogrammed in accordance with one or more embodiments described herein, such that the gaming device may be configured to operate in accordance with various processes described herein.

For example, "variable payout module" may be made available for purchase to various casino operators. The module, which may comprise various hardware and software (e.g., an EPROM storing software instructions), may be installed in an existing gaming device (e.g., a video-reel slot machine, a video poker machine, etc.), such that when the module is installed, players of the device may elect (i) to play the gaming device in a manner that does not incorporate embodiments described herein (e.g., be eligible for payouts based on a conventional payout table), or (ii) to play the gaming device in a manner that incorporates embodiments described herein (e.g., be eligible for payouts that are variable and based on a buy-in amount and/or a previously provided payout). Thus, players who are familiar with operating a gaming device may elect to pay for them in a different or similar manner as they are accustomed to.

Accordingly, a gaming device may be configured to allow a player to select one of two "modes" of the gaming device, and to enable the selected mode. If a player selects a "standard" mode, the gaming device may be configured to operate in a manner similar to how it operated before the installation of the module (e.g., the gaming device operates in a conventional manner, such that embodiments described herein may not be utilized). If a player selects "variable payout" mode, the gaming device may then be operable to execute game play in accordance with one or more embodiments described herein.

In one example of allowing a player to select one or more modes, a touch-sensitive display screen may be configured to output a prompt asking a player to select a mode of operation. Such a prompt may be output in occurrence to various trigger conditions (e.g., coins, bills or tickets are inserted; a credit balance increases from zero to some other number; a player presses a "play" button; a motion, weight, infrared or other sensor detects the presence of a player; etc.). Accordingly, a player may select a mode of operation (e.g., by pressing an appropriately labeled icon of a touch-sensitive display screen), and upon receiving the player's selection, the gaming device may be configured to operate in the selected mode.

In other embodiments, as described, a peripheral device may be useful for implementing one or more embodiments of the present invention into the operation of a conventional gaming device. For example, in order to avoid or minimize the necessity of modifying or replacing a program already stored in a memory of a conventional gaming device, an external or internal module that comprises a peripheral device may be inserted in, connected to or otherwise associated with the gaming device.

In still further embodiments, rather than configure existing gaming devices to execute embodiments described herein by installing or connecting new hardware and/or software, software may be downloaded into an existing memory of one or more gaming devices. U.S. Pat. No. 6,805,634 to Wells et al. teaches methods for downloading data to gaming devices in such a manner. The entirety of U.S. Pat. No. 6,805,634 is incorporated by reference herein for all purposes. Thus, in some embodiments, an existing gaming device may be reprogrammed to accommodate new functionality of the present invention without the need, or by minimizing the need, to remove and replace hardware within the gaming device.

Figure 3:
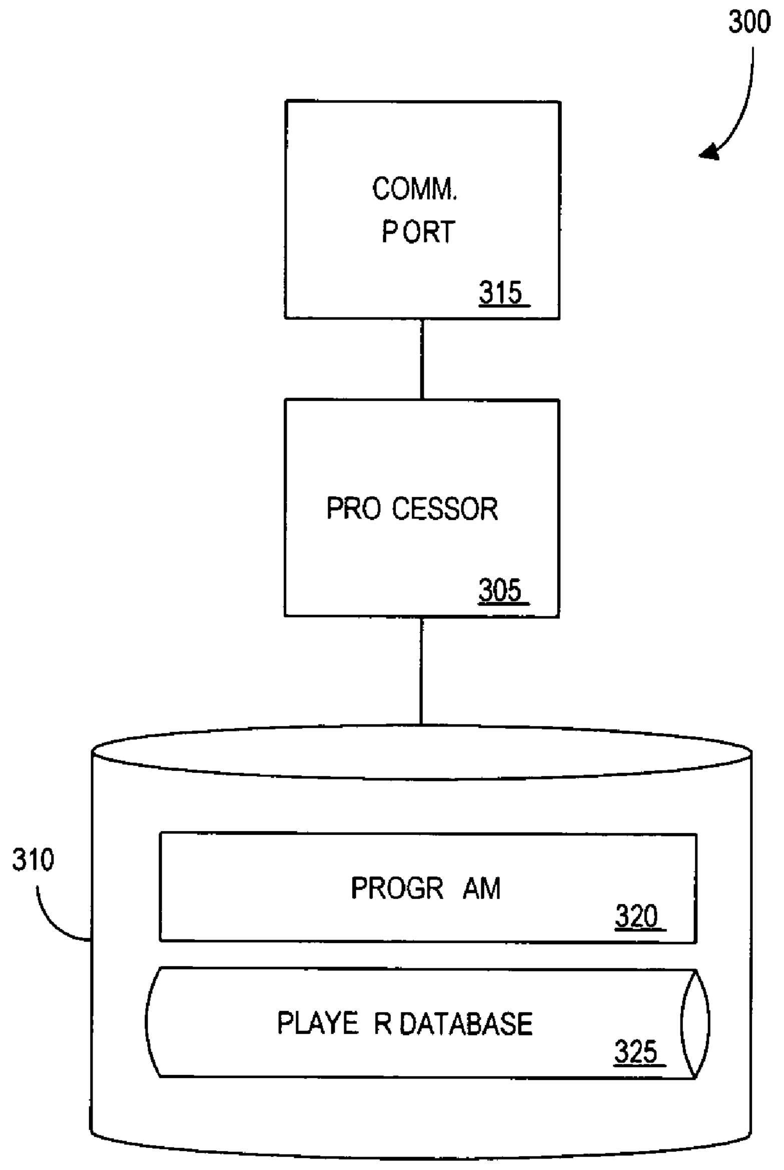
FIG. 3 is a block diagram of an example gaming device that may be utilized to implement one or more embodiments described herein.

Referring now to FIG. 3, illustrated therein is a block diagram of an embodiment 300, which may be an embodiment of controller 110 (FIG. 1). Embodiment 300 is referred to as controller 300 herein. The controller 300 may be implemented as a system controller, a dedicated hardware circuit, an appropriately programmed general-purpose computer, or any other equivalent electronic, mechanical or electromechanical device. The controller 300 may comprise, for example, a server computer operable to communicate with one or more client devices, such as one or more gaming devices, one or more kiosks, one or more peripheral devices, and/or one or more casino personnel devices. The controller 300 is operative to manage the system 100 and execute some or all of the methods described herein.

In operation, the controller 300 may function under the control of a casino, a merchant, or other entity that may also control use of the gaming devices 130, peripheral devices and/or a peripheral device server. For example, the controller 300 may be a slot server in a casino. In some embodiments, the controller 300 and slot server may be different devices. In some embodiments, the controller 300 may comprise more than one computer operating together. In some embodiments, the controller 300 and a peripheral device server may be the same device.

The controller 300 comprises a processor 305, such as one or more Intel® Pentium® processors. The processor 305 is in communication with a memory 310 and a communications port 315 (e.g., for communicating with one or more other devices). The memory 310 may comprise an appropriate combination of magnetic, optical and/or semiconductor memory, and may include, for example, Random Access Memory (RAM), Read-Only Memory (ROM), a compact disc and/or a hard disk. The processor 305 and the memory 310 may each be, for example: (i) located entirely within a single computer or other device; or (ii) connected to each other by a remote communication medium, such as a serial port cable, telephone line or radio frequency transceiver. In one embodiment, the computer 300 may comprise one or more devices that are connected to a remote server computer for maintaining databases.

The memory 310 stores a program 320 for controlling the processor 305. The processor 305 performs instructions of the program 320, and thereby operates in accordance with the present invention, and particularly in accordance with the methods described in detail herein. The program 320 may be stored in a compressed, uncompiled and/or encrypted format. The program 320 furthermore includes program elements that may be necessary, such as an operating system, a database management system and "device drivers" for allowing the processor 305 to interface with computer peripheral devices. Appropriate program elements are known to those skilled in the art, and need not be described in detail herein.

According to an embodiment of the present invention, the instructions of the program 320 may be read into a main memory from another computer-readable medium, such from a ROM to RAM. Execution of sequences of the instructions in program 320 causes processor 305 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

The memory 310 also stores a player database 325. Note that, although this database is described as being stored in controller 300, in other embodiments of the present invention some or all of these databases may be partially or wholly stored in another device, such as one or more peripheral devices, a peripheral device server, one or more of the gaming devices, a slot server (if different from the controller 300), another device, or a combination thereof. Further, some or all of the data described as being stored in the database 325 may be partially or wholly stored (in addition to or in lieu of being stored in the memory 310 of the controller 300) in a memory of one or more other devices, such as one or more of peripheral devices, one or more of the gaming devices 130, a peripheral device server and/or a slot server (if different from controller 300).

In one or more embodiments, memory 310 may store additional databases. For example, a gaming device database that stores information regarding one or more gaming devices may be stored in memory 310 or another memory of system 100. A gaming device database (not shown) may be utilized to store and access information associated with one or more gaming devices with which controller 300 is operable to communicate. Examples of such information include information regarding (i) a manufacturer of a gaming device, (ii) a denomination of a gaming device, (iii) one or more games available on the gaming device, (iv) features available on a gaming device, (v) features currently activated on a gaming device, (vi) a location of a gaming device, (vii) a status of a gaming device, (viii) outcomes obtained via the gaming device, (ix) coin-in of a gaming device, (x) coin-out of a gaming device, and/or (xi) payout tables available for the gaming device.

Figure 4:
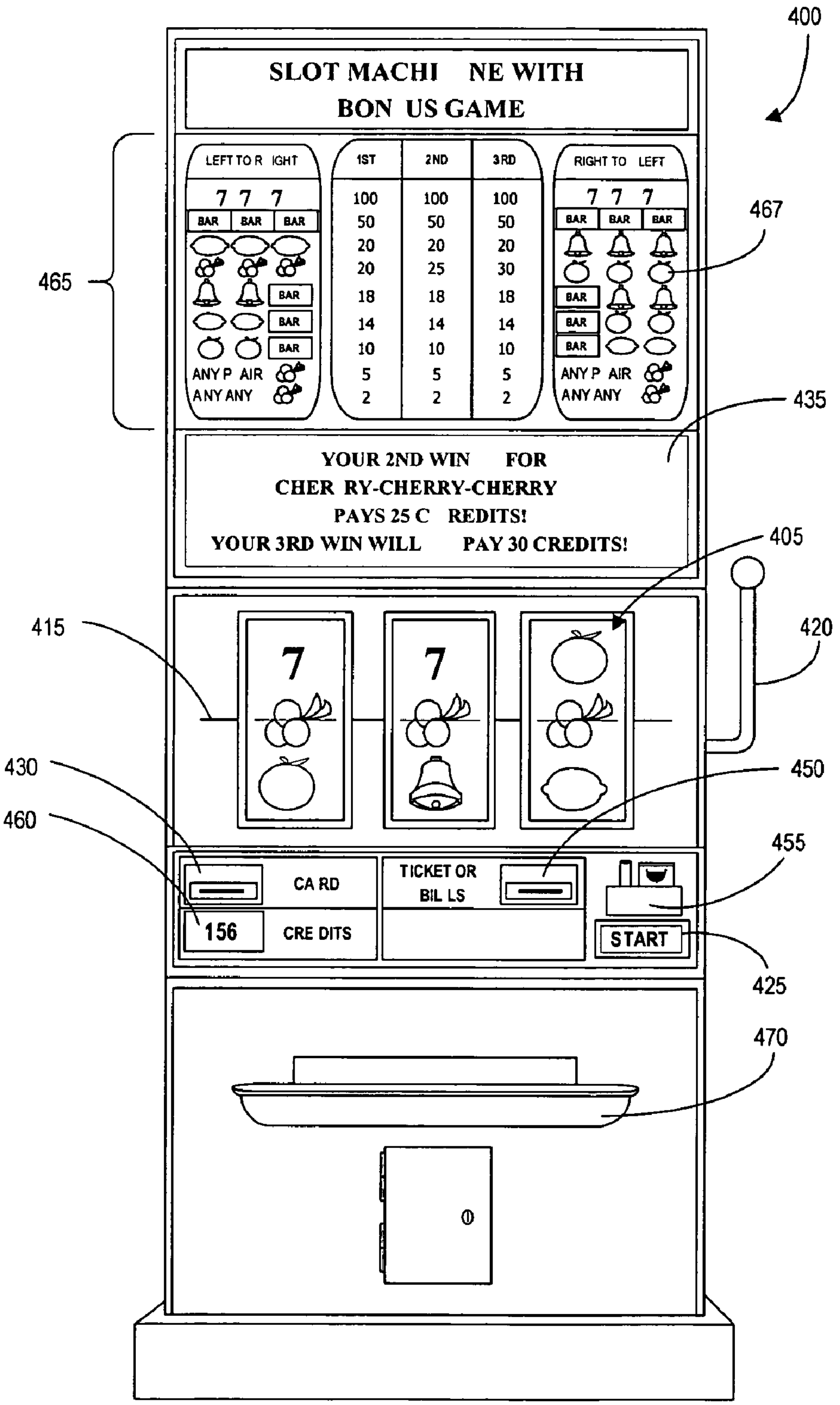
FIG. 4 is an example of a plane view of a slot machine displaying information regarding calculation of a payout, in accordance with one or more embodiments described herein.

Referring now to FIG. 4, illustrated therein is an embodiment 400 of a plan view of a gaming device 130 comprising a three reeled slot machine. Embodiment 400 is referred to as slot machine 400 herein.

The slot machine 400 comprises a display area 405 in which an outcome for a game play of the slot machine is displayed to the player. The display area 405 may, for example, be a video display that displays simulations of reels. The display area 405 may, in another example, be glass behind which are located mechanical reels. Display area 405 is an exemplary embodiment of the display device 255, described with respect to FIG. 2.

Within display area 405 is a payline 415. In accordance with some embodiments of the present invention, an outcome of a game play is a set of symbols displayed disposed along a payline of a reeled slot machine. Slot machine 400 exemplifies such embodiments.

Slot machine 400 further comprises a handle 420. A player may initiate the movement of the reels in display area 405 by pulling on the handle 420. Alternatively, a player may initiate the movement of the reels in display 405 by actuating the start button 425. Either or both of handle 420 and start button 425 are exemplary embodiments of the input device 265, described with respect to FIG. 2.

Slot machine 400 also comprises a player tracking device 430, which is an example of the player tracking device 260 that was described with respect to FIG. 2. The player tracking device 450 may comprise a player tracking card reader and a display (e.g., an LED display) for outputting information related to the player identifier (e.g., player's name and number of comp points associated with player's account).

Also a component of slot machine 400 is another display area 435, for outputting information to a player. The display area 435 may be utilized, for example, to inform a player that he has obtained an outcome that corresponds to a payout of a variable magnitude (and, for example, inform the player of the current magnitude of the payout that will be provided to the player and the basis for the magnitude) and/or that he has qualified for a bonus.

Payment system 440, an exemplary embodiment of payment system 275 of FIG. 2, comprises a bill acceptor 445, a credit, debit and/or smart card reader 450, and a coin or token acceptor 455. A player may utilize payment system 440 to provide, for example, a buy-in amount.

Slot machine 400 further comprises a credit meter balance 460, which is an exemplary embodiment of a benefit output device 250 that was described with respect to FIG. 2. The credit meter balance reflects the amount of electronic credits currently available to a player for wagering and/or cash-out. The electronic credits may be used by a player, for example, as wagers for game plays of the gaming device. The electronic credits may also be "cashed out" as coins, bills, tokens, a cashless gaming receipt, and/or credits to another financial account associated with the player.

The slot machine 400 includes yet another display area, display area 465, which displays a payout schedule of the slot machine 400. The payout schedule displays payouts that correspond to various outcomes obtainable on the slot machine 400. In one or more embodiments, if an outcome is displayed in display area 405 that, as indicated in display area 465, corresponds to a payout, the credit meter balance 460 may be increased by an amount of electronic credits corresponding to the payout. In one or more embodiments, one or more of the payouts associated with respective outcomes in the display area 465 may comprise payouts that are variable (e.g., the magnitude of the payout may vary from one game play to the next, depending on a payout previously obtained, a buy-in amount and/or another factor). The payouts for the outcomes "cherry-cherry-cherry" and "plum-plum-plum", as illustrated in sub-area 567 of display area 565, correspond to a variable payout such that the payout is sixty (60) credits for a first occurrence of the outcome during a play session, sixty-five (65) credits for a second occurrence of the outcome during the play session, and seventy (70) credits for a third and each subsequent occurrence of the outcome during the play session.

Finally, the slot machine 400 comprises a coin tray 470. Payment to the player may be rendered by dispensing coins into the coin tray 470. Such coins may be dispensed based on, for example, a player's indication that the player would like to cash out his credit meter balance and/or a payout obtained by a player as a result of playing a game on the slot machine 400. The coin tray 400 is an exemplary embodiment of the benefit output device 250, described with respect to FIG. 2. Note that slot machine 400 may include different and/or additional components besides those illustrated in FIG. 4.

As described, in the embodiment of slot machine 400, a payout of "cherry-cherry-cherry" corresponds to a variable payout, wherein the magnitude of the payout is based on how many times the outcome "cherry-cherry-cherry" has previously been obtained in a current play session. In other words, the payout for the outcome "cherry-cherry-cherry" is based on a payout previously obtained during the play session (i.e., whether a payout for "cherry-cherry-cherry" has previously been obtained in the current play session and, if so, how many times it has been obtained). In the example of FIG. 4, the payout of "cherry-cherry-cherry" is shown as having been obtained (i.e., the indicia comprising the outcome are disposed along the payline of the slot machine 400 as a result of a game play). As indicated in display area 435, this is the second occurrence of the outcome "cherry-cherry-cherry" during the current play session. Accordingly, as also indicated in the message being output in display area 435, the payout being provided for this obtainment of the outcome "cherry-cherry-cherry" is sixty-five (65) credits, in accordance with the payout schedule of slot machine 400.

As would be appreciated by one of ordinary skill upon reading the present disclosure, a slot machine utilizing a payout schedule such as the payout schedule of slot machine 400 would encourage a player of the slot machine 400 to remain playing once the player obtained the first occurrence of either the outcome "cherry-cherry-cherry" or the outcome "plum-plum-plum." This may be at least partially due to the fact that the payout for the obtained outcome that the player is eligible for after the initial occurrence of the outcome has increased as a result of the player's play of the slot machine 400.

It should be noted that a gaming device may not be limited to a traditional, reel-based slot machine. A variety of other devices are imagined. For example, in some embodiments, a gaming device may display outcomes in the form of brief video clips or animated sequences. In one embodiment, each game play of a gaming device comprises a video presentation of a sports play. For example, if a baseball sequence shows an animated baseball player hitting a home run, a player may receive 50 credits, whereas a player hitting for a single might yield a smaller payout, a strikeout may yield no credits, etc. A variety of source material, including but not limited to television clips (e.g., soap opera scenes), animated sequences (e.g., cartoons) or other footage may be used in this manner. Such methods are described at length in Applicant's pending U.S. patent application Ser. No. 10/417,758, entitled GAMING DEVICE METHODS AND APPARATUS EMPLOYING AUDIO/VIDEO PROGRAMMING OUTCOME PRESENTATION, filed Apr. 16, 2003, the entirety of which is incorporated by reference herein for all purposes. In other embodiments, a gaming device may comprise a video poker machine (e.g., an independent payout amount is 10 credits for an outcome of two pair), a video keno machine (e.g., an independent payout amount is 20 credits for four matching numbers), or any other popular casino game.

Figure 5:
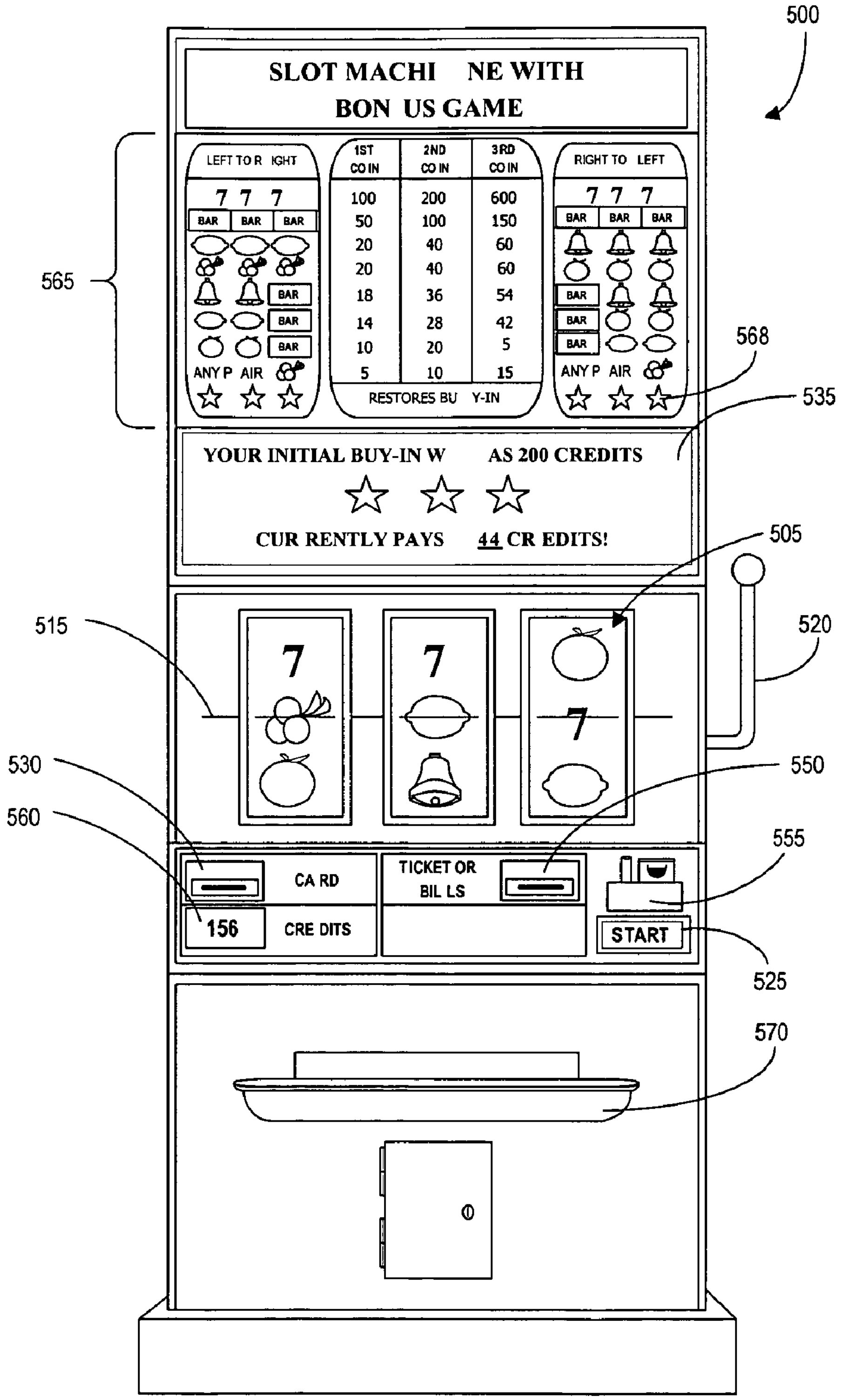
FIG. 5 is an example of a plane view of a slot machine displaying information regarding calculation of a payout, in accordance with one or more embodiments described herein.

Referring now to FIG. 5, illustrated therein is an embodiment 500 of a plan view of an example gaming device 130 comprising a three reeled slot machine. Embodiment 500 is referred to as slot machine 500 herein. Slot machine 500 includes many of the same components as the slot machine 400 of FIG. 4. For purposes of brevity, such components will not again be described herein.

Slot machine 500 may be useful in an embodiment in which a reset outcome is made available on a payout schedule. As described herein, a reset outcome may correspond to a payout that is based on a buy-in amount, a loss amount and/or a current gaming device balance. As illustrated in display area 565, at the bottom of the payout schedule displayed therein, an outcome of "payback-payback-payback" disposed along payline 515 will result in the credit meter balance as displayed in the credit meter display 560 to be reset to a buy-in amount.

In one embodiment, information describing the payout corresponding to a reset outcome (e.g., as displayed on a payout schedule of the gaming device via which the outcome is available) may be updated throughout a session based on current session information. Thus, for example, if a reset outcome results in a credit meter balance being reset to an initial buy-in amount, the information describing the payout corresponding to the reset outcome may be adjusted upon each game play of a play session (i.e., upon each wager during a play session being deducted from the credit meter balance). For example, once an initial buy-in is input to the gaming device, the initial buy-in may be displayed to a player of a gaming device, thus informing the player throughout the play session of the amount the credit meter balance will be reset to upon the obtainment of the reset outcome. In another example, the amount of credits to be added to the credit meter balance upon the obtainment of the reset outcome may be displayed and updated upon each game play, the amount being the result of subtracting the current credit meter balance from the initial buy-in. For example, sub-area 568 of display area 565 describes to a player that the credit meter balance will be reset to an initial buy-in amount (e.g, which is 200 credits in the particular example of FIG. 5, as indicated in display area 535) upon the obtainment of the reset outcome. Display area 535, on the other hand, describes to the player the actual amount of credits that will be added to the credit meter balance at any given time in order to reset the credit meter balance to the initial buy-in amount that is indicated in the display area 535. In the particular example illustrated in FIG. 5, display area 535 indicates that, based on the credit meter balance of 156 credits, a payout of 44 credits will be added to the credit meter balance upon the obtainment of the reset outcome, in order to reset the credit meter balance to the identified initial buy-in amount of 200 credits. In one embodiment, the amount of credits to be added to the credit meter balance upon the obtainment of the reset outcome (i.e., the payout for the reset outcome) may be updated upon a wager amount being deducted from the credit meter balance and upon a payout being added to the credit meter balance.

It should be noted that although slot machine 500 has been described in terms of a single reset outcome being available, in other embodiments multiple different reset outcomes may be available via a given gaming device. For example, a first reset outcome may correspond to a payout that results in a credit meter balance equal to an initial buy-in amount while a second reset outcome may correspond to a payout that results in a credit meter balance equal to a total buy-in amount for the current play session. Similarly, both a reset outcome and another outcome corresponding to a payout that is based on another payout (various types of such outcomes and payouts are described herein) may be available via a given gaming device.

It should further be noted that, in some circumstances, a credit meter balance at a time of obtainment of a reset outcome may be greater than the amount the credit meter balance is to be set to in response to the obtainment of the reset outcome. Such a circumstance may be handled in various manners. For example, in one embodiment credits may be deducted from the credit meter balance in order to set the credit meter balance to the lower buy-in amount. In such an embodiment a reset outcome may be a benefit to a player in some circumstances and a detriment in other circumstances. In another example, the effect of the reset outcome may not be applied if the credit meter balance at the time of obtainment of the reset outcome is greater than the amount the credit meter balance is supposed to be set to in response to the obtainment of the reset outcome. In yet another example, if a random number is determined that corresponds to a reset outcome, it may first be determined whether application of the reset outcome would result in an increase of the credit meter balance and the random number may be discarded and another determined if such is not the case. In yet another example, a player may be allowed to "bank" a reset outcome for future use (e.g., at the player's discretion, for automatic application upon the credit meter balance falling below the amount that the credit meter balance is to be set to as a result of the obtainment of the reset outcome).

Referring now to FIG. 6, illustrated therein is a tabular representation 600 of an example embodiment of a probability database 220. Tabular representation 600 is referred to herein as probability database 200. The probability database 600 may be utilized by a device to store and/or access information about outcomes available on a gaming device and the random number(s) corresponding to each respective available outcome.

For example, upon determining an initiation of a game play, a gaming device 130 may generate a random number and access probability database 600 to determine the outcome that corresponds to the random number. The gaming device may then output an indication of the outcome as a result of the game play (e.g., if the gaming device is a reeled slot machine, the gaming device may direct a reel controller of the gaming device to rotate the reels and stop them such that symbols comprising the determined outcome are disposed along a payline of the gaming device).

The probability database 600 includes a number of example records or entries, including records R600-1 through R600-5, each defining an outcome that may be obtained on a gaming device utilizing the probability database 600. Those skilled in the art will understand that the probability database 600 may include any number of entries. The probability database 600 also defines fields for each of the entries or records. The fields specify: (i) a random number 605, (ii) a first reel indicium 610, (iii) a second reel indicium 615, and (iv) a third reel indicium 620. It should be noted that the example probability database 400 is one that may be used in a gaming device comprising a three reel slot machine. Of course, if another type of gaming device were used (e.g., a five reel slot machine, a video poker machine, a blackjack machine), the probability database may define the outcomes corresponding to a random number as appropriate (e.g., for a video poker machine, a set of ten cards (five for an initial hand and five for a final hand) may correspond to a random number). In one embodiment, the random number field 605 may include a range of random numbers rather than a single random number.

In one embodiment, one or more specified outcomes may cause a calculation or determination of an outcome based on a buy-in amount, as described in detail herein. The last record illustrated in probability database 600 illustrates an example of such an outcome as being an outcome comprised of the symbols "payback-payback-payback" disposed along a payline of a three reeled slot machine.

Referring now to FIG. 7A, illustrated therein is a tabular representation 700A of an example payout database 225. Tabular representation 700A is referred to herein as payout database 700A. The payout database 700A may be utilized by a device (e.g., a gaming device) to determine a payout that corresponds to an outcome determined as a result of a game play (e.g., via a random number).

The payout database 700A includes a number of example records or entries, including records R700A-1 through R700A-6, each defining a payout corresponding to a respective outcome. Those skilled in the art will understand that the payout database 700A may include any number of entries. The payout database 700A also defines fields for each of the entries or records. The fields specify: (i) an outcome 705A and (ii) a payout 710A that corresponds to the outcome of the record. As illustrated in records R700-4 through R700A-6, respectively, a definition of a payout may comprise a formula by which the payout is to be determined rather than a predetermined number. As further illustrated in records R700A-4 through R700A-6, the formula for determining a payout may include as a factor one or more payouts previously obtained.

In one embodiment, payout database 700A may be accessed upon an outcome being determined (e.g., an outcome may be determined using a random number generator and probability database 600). Thus, if the outcome corresponds to a payout defined by a formula, the payout may be calculated using the formula once the corresponding outcome is obtained and a need for determining the payout determined. Accordingly, in one embodiment, prior to the outcome being obtained (and perhaps even after the outcome being obtained) a payout schedule reflecting the information of payout database 700A may merely output the formula by which the payout corresponding to the subject outcome will be determined upon being obtained. In another embodiment, however, the formula defining a payout may be utilized on a continuous, periodic or non-periodic bases to determine what a payout corresponding to the outcome would be if the outcome were obtained as a result of the next game play. For example, upon each payout being provided, the payout database 700A may be accessed and any formulas corresponding to respective outcomes may be utilized to update the magnitude of the payouts corresponding to the respective outcomes. Accordingly, a payout schedule that reflects the information of payout database 700A and that is displayed to a player may be updated (e.g., in response to a payout being provided for an outcome) such that the player is aware, prior to each game play, of the exact magnitude of each payout achievable for the game play, even if some of the payouts are variable and calculated based on other payouts previously provided to the player.

It should be noted that other formulas or definitions of payouts that are more complex than the ones illustrated in payout database 700A are within the scope of the present invention. For example, as described herein, a payout for a given outcome may vary from one occurrence of the outcome to another. For example, in one embodiment a payout database may define a first payout for a first occurrence of an outcome during a play session and a second, greater, payout for a second occurrence of the outcome, provided the second occurrence occurs within a predetermined amount of time (e.g., ten minutes) and/or a predetermined number of game plays (e.g., fifty game plays) of the first occurrence. In another example, a payout database may define a first payout for a first occurrence of an outcome during a play session and a second, greater, payout for a second occurrence of the outcome, provided one or more events have transpired between the first and second occurrence (e.g., a particular outcome was achieved, a particular symbol was "collected," and so on).

Referring now to FIG. 7B, illustrated therein is a tabular representation 700B of an example payout database 225. Tabular representation 700B is referred to herein as payout database 700B. The payout database 700B may be utilized by a device (e.g., a gaming device) to determine a payout that corresponds to an outcome determined as a result of a game play (e.g., via a random number). Further, payout database 700B may be utilized for a game comprising multiple segments, in which a maximum payout for a segment is determined (e.g., at a time of creation, coding or modification of the game). The maximum payout may be allocated among various events throughout the segment, such that the final possible payout for a given segment (e.g., a payout corresponding to the final achievable event in the segment) is determined by subtracting all payouts previously provided throughout the segment from the maximum payout.

The payout database 700B includes a number of example records or entries, including records R700B-1 through R700B-5, each defining a payout corresponding to a respective outcome. Those skilled in the art will understand that the payout database 700B may include any number of entries. The payout database 700B also defines fields for each of the entries or records. The fields specify: (i) an outcome 705B and (ii) a payout 710B that corresponds to the outcome of a given record.

The payout database 700B may be utilized, for example, to determine payouts for a game that is composed of at least two segments (e.g., segment 1 and segment 2) during which at least two outcomes (e.g., outcome A, outcome B and outcome C) may be obtained. For example, a player playing the game associated with payout database 700B may first need to successfully finish segment 1 of the game in order to qualify for segment 2. Further, while playing segment 1, the player may have the opportunity to achieve one or more outcomes (e.g., outcome A and outcome B) that correspond to respective payouts based on events that occur during the play of segment 1. Upon qualifying for segment 2, the player may have the opportunity to achieve at least outcome C.

As illustrated by record R700B-3 of payout database 700B, the maximum payout that the player may receive during segment 1 is fifty (50) credits. Thus, if the player obtains the last possible outcome in segment 1 without having been provided with any other payouts during segment 1, the player would be provided with fifty (50) credits. Otherwise, any payouts previously provided to the player during the segment would be subtracted from the maximum fifty (50) credits and the remainder would be provided to the player as a payout for the last possible outcome of segment 1. The last possible outcome of a segment may comprise, for example, an outcome for a particular event in the segment (e.g., the last event for which the player is allowed to achieve an outcome that corresponds to a payout). In another embodiment, a segment may comprise a period of time defined by a maximum number of game plays, a maximum number of qualifying game plays (e.g., game plays that correspond to a payout greater than zero), and/or a number of minutes or other units of time. In such an embodiment, the last possible outcome for the segment may comprise the last outcome obtained at the end of the period of time as defined.

Referring now to FIG. 7C, illustrated therein is a tabular representation 700C of an example payout database 225. Tabular representation 700C is referred to herein as payout database 700C. The payout database 700C may be utilized by a device (e.g., a gaming device) to determine a payout that corresponds to an outcome determined as a result of a game play (e.g., via a random number). Further, payout database 700C may be utilized for a game in which a reset outcomes are available.

The payout database 700C includes a number of example records or entries, including records R700C-1 through R700C-7, each defining a payout corresponding to a respective outcome. Those skilled in the art will understand that the payout database 700C may include any number of entries. The payout database 700C also defines fields for each of the entries or records. The fields specify: (i) an outcome 705C and (ii) a payout 710C that corresponds to the outcome of a given record.

As described herein, a reset outcome may comprise an outcome may be an outcome that causes a payout to be provided, wherein the payout is based on a buy-in amount, a loss amount and/or a current gaming device balance. Payout database 700C illustrates various example reset outcomes.

Referring now to FIG. 8A, illustrated therein is a tabular representation 800A of an example session database 230. Tabular representation 800A is referred to herein as session database 800A. The session database 800A may be utilized by a device (e.g., a gaming device 130, controller 110) to store and access outcomes received during a session, for use in determining payouts that are based on other payouts previously obtained during the session. In the embodiment of session database 800A, payouts that are not based on previously obtained payouts are referred to as "independent" payouts while payouts that are based on previously obtained payouts are referred to as "dependent" payouts (e.g., the magnitude of these payouts depends upon a previously provided payout).

The session database 800A includes a number of example records or entries, including records R800-1 and R800-2, each defining an outcome and/or payout obtained during the play session of the record. Those skilled in the art will understand that the session database 800A may include any number of entries. The session database 800A also defines fields for each of the entries or records. The fields specify: (i) a session identifier 805A that identifies (e.g., uniquely) a play session; (ii) an player identifier 810A that identifies (e.g., uniquely) one or more players associated with the play session; (iii) a session status 815A that indicates a current status of the play session (e.g., whether the play session is currently in progress and thus active); (iv) an outcome 8210A that has been obtained during the play session; (v) an outcome type 825A that indicates whether the outcome corresponds to an independent payout or a dependent payout; and (vi) a payout 830A that corresponds to each respective outcome.

It should be noted that the session database 800A may, in some embodiments, include information in addition to that illustrated in FIG. 8A. Examples of such information include, for example, at time at which an outcome was obtained, a gaming device identifier that identifies the gaming device at which an outcome was obtained, and an indication of an input by a player that is associated with the game play for which an outcome was obtained (e.g., which cards were initially dealt to a player and/or discarded by the player during a video poker game play).

A record of session database 800A may be opened, for example, upon an initiation of a play session at a gaming device (e.g., upon a player inserting a player tracking card and/or providing a buy-in amount). In one embodiment, an indication of each outcome obtained during the play session may be stored in the record. In another embodiment, only indications of qualifying outcomes (i.e., outcomes that qualify to have an indication thereof stored in the session database) may be stored. For example, only indications of independent payouts that may be needed to subsequently determine dependent payouts may be stored (e.g., payouts that are greater than zero).

Referring now to FIG. 8B, illustrated therein is a tabular representation 800B of an example session database 230. Tabular representation 800B is referred to herein as session database 800B. The session database 800B may be utilized by a device (e.g., a gaming device 130, controller 110) to store and access outcomes received during a session, for use in determining payouts for available reset outcomes.

The session database 800B includes a number of example records or entries, including records R800B-1 through R800B-4, each indicating information associated with a play session. Those skilled in the art will understand that the session database 800B may include any number of entries. The session database 800B also defines fields for each of the entries or records. The fields specify: (i) a session identifier 8101B that identifies (e.g., uniquely) a play session; (ii) a player identifier 815B that indicates (e.g., uniquely) an identifier of a player associated with the session; (iii) a total buy-in 815B that indicates the sum of all monetary input provided to the gaming device for wagering purposes; (iv) a current balance 820B that indicates a current credit meter balance of a gaming device associated with the play session; and (v) a session loss amount 825B that indicates the sum of all wagers lost by the player during the play session.

The information of a record of the session database 800B may be used to calculate a payout for a reset outcome that has been obtained by a player and/or that may be obtained by the player. For example, (referring to both session database 800B and to payout database 700C (FIG. 7C)) assume a player associated with the player identifier "P-106998" (record R800B-1 of session database 800B) is playing a gaming device utilizing the payout database 700C. Further assume that the player obtains an outcome of "reset-reset-reset" (record R700C-7 of payout database 700C). In accordance with the information of record R800B-1 and record R700C-7, the player will be provided with a payout of fifty-three (53) credits. This is because according to record R700C-7, the player is to be provided with a payout amount that results in the credit meter balance being set to the total buy-in for the session. According to record R800B-1, the total buy-in for the session is eighty (80) credits and the current credit meter balance is forty-seven (47) credits. Thus, it will take fifty-three (53) credits to set the credit meter balance to the total buy-in of eighty (80) credits. Continuing with the example, if the player were instead to have obtained an outcome of "pay-back-payback-payback" (record R700C-4 of payout database 700C), the player would have been provided with a payout of thirty-three (33) credits, which is the player's current session loss amount.

Referring now to FIG. 9, illustrated therein is a tabular representation 900 of an example player database 325. Tabular representation 900 is referred to herein as player database 900. The player database 900 may be utilized by a device (e.g., a gaming device 130, controller 110) to store and access information associated with a player.

The player database 900 includes a number of example records or entries, including records R900-1 through R900-4, each indicating information associated with a player. Those skilled in the art will understand that the player database 900 may include any number of entries. The player database 900 also defines fields for each of the entries or records. The fields specify: (i) a player identifier 905 that uniquely identifies a player, (ii) a name 910 of a player, (iii) an address 915 of a player, and (iv) session identifier(s) 920 associated with a player. In one or more embodiments, a player database may include additional information, such as a financial account identifier associated with a player, an indication of comp points available to a player, a theoretical win associated with the player, and/or an actual win/[loss] associated with the player.

The information in the player database 900 may be created and updated, for example, based on information received from a player, a casino employee, a gaming device 130, a peripheral device, and/or a peripheral device server. For example, the information may be created when a player registers with a casino and receives a player tracking card encoded with the player identifier. The information may be subsequently updated when a player requests to update the information or when additional information is obtained about the player via the casino's interactions with the player (e.g. the lifetime theoretical win may be updated on an ongoing basis as the player plays games at a casino).

It should be understood that although a player identifier and information related to each registered player is described in detail, a player need not be registered in order to obtain benefits of the present invention (e.g., obtain outcomes that correspond to payouts based on previously provided payouts or buy-in amounts). Accordingly, registration of a player and storing of information related to a player is not necessary for practice of the present invention.

A player database may be utilized to store and/or access historical data associated with specific players. A player database may be used, for example, to store player wager data so that players wagering over a given threshold in a given amount of time may be rewarded for their patronage. The player database may also contain other information that may be useful in, for example, promoting and managing player behaviors (e.g., information about the player's gaming preferences, previous alternate payment offer selections and/or preferences, outstanding debts, lodging arrangements, and the like). Further, the player database may store data regarding a given player's standing in a game session or bonus game, so that the player can continue the game session or bonus game at a plurality of game machines that have common access to the player database. Such player data may be stored in a relational database and retrieved or otherwise accessed by the processor after receiving a "key" data point from the player, such as a unique identifier read from the player's player tracking card or cashless gaming ticket.

Figure 10:
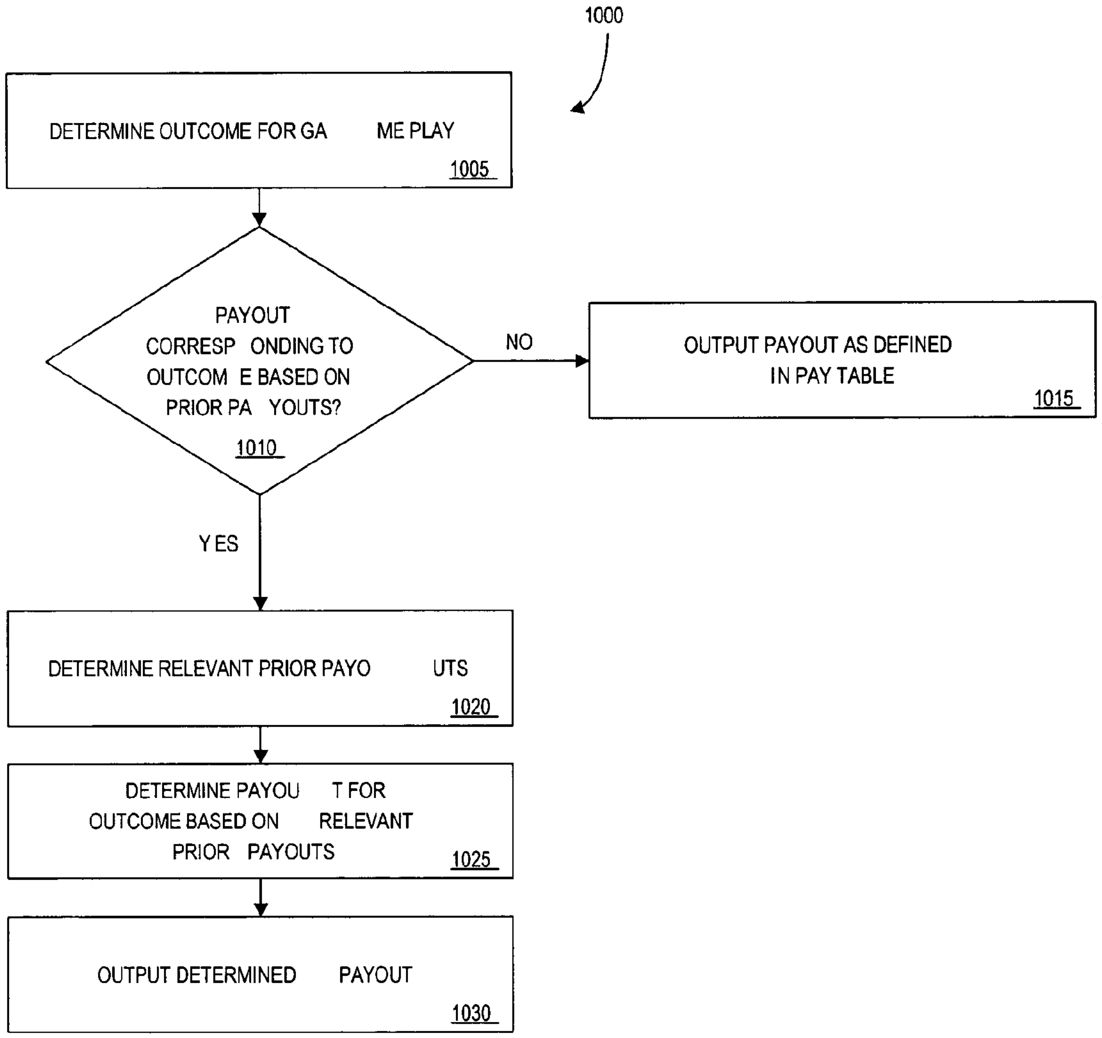
FIG. 10 is flowchart illustrating an example process consistent with one or more embodiments described herein.

Referring now to FIG. 10, illustrated therein is a flowchart of an example process 1000 that may be performed in accordance with one or more embodiments of the present invention. Process 1000 may be performed by any combination of any of the devices described herein. Process 1000 may be performed, for example, upon an outcome being determined for a game play in order to determine the payout to provide for the outcome. In another example, process 1000 may be performed upon an outcome being determined for a game play, in order to determine a payout for another outcome that is available but has not yet been determined.

In step 1005, the outcome for a game play is determined. In an embodiment in which the process 1000 is performed in order to determine a payout to provide for the determined outcome because the outcome has been obtained as a result of the game play, determining the outcome may comprise determining a random number and determining the outcome that corresponds to the random number (e.g., in a probability database). In embodiments in which player skill is relevant to determining the outcome, determining the outcome may include determining an input from a player and taking the input into account in determining the outcome. In embodiments in which step 1005 is performed by a controller 110 yet the outcome is generated at a gaming device 130, step 1005 may comprise receiving an indication of the outcome from the gaming device 130.

In embodiments in which process 1000 is performed in order to determine payouts for outcomes that have not yet been obtained but that are available (e.g., wherein the payouts are based on previously obtained payouts and a payout schedule of a gaming device is updated upon an output of each relevant payout), step 1005 may comprise selecting an outcome from a set of available outcomes (e.g., an outcome listed on a payout schedule). For example, in one embodiment a device may perform the process 1000 for each available outcome (or each available outcome that corresponds to a payout that is based on a prior payout) upon an output of a payout or an output of a relevant payout (e.g., where a relevant payout is a payout that is relevant to determining another payout).

It should be noted that, in some embodiments, process 1000 may include steps in addition to those illustrated in FIG. 10. For example, process 1000 (or another process performed in accordance with embodiments of the present invention) may include one or more of the following steps: (i) identifying a gaming device player, (ii) determining a beginning or end of a play session, (iii) receiving information from another device, (iv) transmitting information to another device, (iv) opening a new record in a database, (v) accessing a record in a database, and (vi) storing an indication of information (e.g., in temporary memory and/or a database). For example, a record in a session database may be opened and information relevant to the play session may be stored in the record. Examples of such information includes an indication that a game session has begun, payout amounts paid to a player, outcomes obtained by the player, wagers placed and/or lost by the player, buy-in amounts provided by the player. For example, if a player approaches a slot machine and inserts a player tracking card, a gaming device may be operable to (i) determine a player identifier by reading the card (e.g., a series of numeric digits as indicated by a record of a player database), and (ii) create a record of a game session associated with the determined player identifier (e.g., a record is created in a session database). Accordingly, a device may then track various data during the session (e.g., payout amounts, the status of various game elements, etc.).

In step 1010 it is determined whether the payout corresponding to the outcome determined in step 1005 is a payout that is based on a payout that has been previously provided during a relevant period of time (e.g., during the current play session). For example, a payout database may be accessed in order to determine whether the outcome determined in step 1005 is categorized as an "independent" payout (i.e., a payout that is not based on a prior payout or other session data) or a "dependent" payout (i.e., a payout based on a prior payout or other session data). In another example, a payout schedule may be accessed to determine whether the outcome corresponds to a predetermined amount of credits or a formula based on which a number of credits is to be calculated.

If it is determined that the outcome determined in step 1005 corresponds to a payout that is not based on a prior payout, the process 1000 continues to step 1015. In step 1015 the payout that is a predetermined number of credits (e.g., as defined by a payout database) is output. For example, an appropriate number of credits is added to a credit meter balance. In another example, an appropriate number of coins are output (e.g., five quarters are released from a hopper mechanism into a coin tray). In other embodiments, a payout amount may not be output until the end of a game session and/or a player may not be able to cash out a payout amount immediately.

As described, in one or more embodiments process 1000 may include storing information about an outcome obtained by a player and/or a payout provided to a player. In one embodiment, during a game session, an indication of each outcome and payout amount obtained by a player is stored in a session database (e.g., a gaming device processor in communication with a slot server writes data to a database stored on the server). In other embodiments, a gaming device may only track winning outcomes during a gaming session. It should also be noted that, in some embodiments, to alleviate the burden of storing large amounts of data for long periods of time (i.e., purchasing large amounts of memory and/or hard disk may represent an undue expense to a casino), a gaming device may only store payout data associated with "live" or active game sessions. For example, once a player ends a gaming session by cashing out and walking away from a slot machine, the slot machine may delete the record it created associated with his session (as such data may no longer be needed).

Returning to process 1000 as illustrated in FIG. 10, if, on the other hand, it is determined in step 1010 that the payout corresponding to the outcome is based on a prior payout, process 1000 continues to step 1020. In step 1020 all payouts previously provided that are relevant to the determination of the current payout are determined. For example, a formula corresponding to the outcome determined in step 1005 may specify one or more prior payouts that are relevant to the calculation of the current payout. For example, assuming payout database 700A (FIG. 7A) is being utilized to determined the current payout and that the outcome determined in step 1005 is "bar-bar-bar", record R700A-4 indicates that all payouts previously provided during the current session are relevant to the calculation of the current payout. Assuming, in another example, that the outcome "wild-wild-wild" had been determined in step 1005, record R700A-6 indicates that the last three payouts provided are the relevant payouts. It should be noted that the last three payouts may refer, in some embodiments, to the last three payouts that were greater than zero and/or the last three payouts obtained by the player participating in the current play session. In other words, a payout of zero credits and/or a payout obtained by another player (e.g., assuming the current player just began the current play session and has not yet obtained three payouts) may not qualify as being relevant to the determination of the current payout.

In one embodiment, step 1020 may comprise accessing a session database to determine information associated with previous payouts that are relevant to the determination of the current payout. For example, a payout database (e.g., such as payout database 700A) may first be accessed to determine the manner in which the current payout is to be determined (e.g., the formula to use in calculating the current payout may be determined) and the payouts relevant to this determination may be determined. A session database or other memory may then be accessed and the information associated with the payouts (e.g., the number of credits or coins provided) may be determined from this data.

In step 1025, the payout for the outcome determined in step 1005 is determined. For example, the payouts determined as relevant in step 1020 may be input into a formula based on which the payout is to be determined and the result calculated.

For example, in various embodiments, a payout amount may be based on one or more previously provided payouts. In some such embodiments, a payout amount may be determined by a calculation comprising a stored "base amount" and one or more previously provided payouts (e.g., payouts previously provided during the current play session and for a current segment of a game). For example, referring to record R700A-4, an outcome of "Bar-Bar-Bar" may yield 500 coins (i.e., a base amount) less the sum of all payouts paid during the session. A variety of such examples are imagined. For example, a payout amount may be determined by (i) adding one or more payout amounts paid previously to a base amount (i.e., the player's first winning outcome of a session determines a bonus amount which will be added to all subsequent qualifying payouts), (ii) dividing a base amount by one or more previous payout amounts (e.g., "1,000 coins divided by your last payout!"), (iii) multiplying a base amount by one or more previous payout amounts (e.g., an outcome of "4×-4×-4×" multiplies a previous "fruit" payout by four), and so on. Thus, in some embodiments, a payout amount may be based only on previous outcomes of a certain type (e.g., "fruit" outcomes, outcomes corresponding to a particular category such as "independent" or "dependent", etc). It should be appreciated that variations of such examples are contemplated within the scope of the present invention.

In other embodiments, a base amount may be variable. For example, record R700A-6 illustrates that an outcome of "Wild-Wild-Wild" may yield a payout determined by subtracting the sum of the last three payout amounts paid to a player from a base amount ranging between 50 and 1200. The base amount may be selected based on a random number, information associated with a player, information associated with a gaming device and/or information associated with one or more prior game plays. Thus, in some embodiments, the step of determining a payout amount based on a prior payout may comprise generating a random number as described (e.g., within a predetermined range of numbers).

In further embodiments, a payout amount that is based on a prior payout may be based on (i) one or more previous payout amounts, (ii) a game parameter, and optionally, (iii) a base amount. For example, if a "current speed" parameter of a racing-themed game is 150 mph, a payout amount for an outcome of "Gas-Gas-Gas" may be 50 credits plus a previous payout amount, but if the current speed parameter increases to 160 mph, a "Gas-Gas-Gas" payout may be 60 credits plus a previous payout amount. Such game parameters may be stored in a temporary memory and/or session database. A variety of game parameters are imagined (e.g., a number of accumulated resources or symbols attained during a session, a number of Aces dealt during a poker game, etc.). Examples of a resource that may be available for a game include a feature, character, or bonus.

In still further embodiments, a base amount may not be used in calculating a payout amount that is based on a prior payout. For example, am outcome of "Plus-Plus-Plus" might yield a payout amount determined by adding two or more previous payout amounts together.

In still further embodiments, a payout amount may not be based on a previous payout amount but rather on other types of game data, which may also be stored in a session database. A payout amount may be based on the status of a particular game element or game parameter. For example, a payout may be determined by (i) multiplying a base amount by a number of collected cherries in a slot game, (ii) dividing a base amount by a number of winning outcomes achieved during a game session, (iii) subtracting from a base amount a number of hotels currently in play during a Monopoly® game, and so on.

In still further embodiments, a payout amount in accordance with the present invention may be based (e.g., in addition to or in lieu of being based on a prior payout) on information such as (i) coin-in during a specified period of time (e.g., a play session), (ii) a number of bonus rounds, outcomes, symbols or other events achieved during a specified period of time (e.g., during a play session), and (iii) one or more future outcomes. As an example of the latter, a payout corresponding to an outcome of "future-future-future" may be defined as twenty (20) coins+three (3) times the amount for the next "cherry-cherry-cherry" outcome. Thus, in this example, obtainment of the outcome "future-future-future" may cause twenty (20) coins to be added to the credit meter balance at the time this outcome is achieved, and additional credits to be added to the credit meter balance if and when the outcome "cherry-cherry-cherry" is obtained (e.g., during the same play session).

Once the payout is determined, the process 1000 continues to step 1030, in which the payout is output. A payout may be output in any of the manners described herein, including as described with respect to step 1015. An indication of the output payout may be stored for subsequent use (e.g., in a temporary memory and/or a session database). In one embodiment, it may first be determined whether the payout output in step 1030 may potentially be relevant to the determination of another payout and the indication of it may only be stored if it is determined to be potentially relevant.

In some embodiments, a gaming device may output an indication of one or more previous payout amounts via an output device. For example, a portion of a display screen may read "Your last payout: 25 coins" and/or "Total payout this session: 103 coins." In this manner, more attention may be drawn to previous payout amounts and players may experience heightened anticipation in advance of obtaining payouts that are based on prior payouts (e.g., a slot machine cabinet advertises "Wild Bonus pays 10×your last payout amount!"). In another application of such an embodiment, the final payout amount of a first session may remain displayed as a second session begins (e.g., such that if a player hits "10× your last payout" as the first outcome of a session, a payout amount from a previous session may be used). It should be noted that displaying such data may have other benefits (e.g., displaying a previous payout amount may continually remind a player of his/her success).

In some embodiments, a game play may be separated into two stages. For example, in a video draw poker game, a game play may comprise one hand. A player may receive an initial hand during a first stage, and draw cards to receive a final hand during a second stage. In currently popular video poker games, the player would normally only be paid for the final hand according to a paytable. For example, if a first hand is A♠-A♦-K♦-K♣-8♥, and a final hand is A♠-A♦-K♦-K♣-K♥, a player is paid 40 coins for an outcome of "Full House". In one embodiment of the present invention, a player may be paid for both an initial hand and a final hand. For example, a player may be paid a first payout amount for receiving A♠-A♦-K♦-K♣-8♥ (i.e., "Two Pair"), and then a second payout amount for achieving A♠-A♦-K♦-K♣-K♥. In one such embodiment, the second payout amount may be based on the first payout amount. For example, the player may be paid 10 coins for the Two Pair, then 15 coins for the Full House, the 15 coins being determined by subtracting the 10 coins from a base amount (i.e., a Full House pays 25 coins less any "initial hand payouts").

As described, in various embodiments a payout amount that will be paid to a player should the player achieve a particular outcome may be communicated to the player prior to the player achieving the particular outcome. For example, assume that in a football-themed game, an outcome of "Touchdown-Touchdown-Touchdown" pays 100 credits minus any "first down" payouts achieved by the player. Thus, at the game's outset, a display may indicate "Touchdown-Touchdown-Touchdown pays 100 credits," but as the game progresses, the amount may be decremented by five credits each time the player achieves a first down.

In some embodiments, the step of determining a payout amount based on a prior payout (e.g., step 1025) may additionally comprise adjusting gaming device probability. For example, if an outcome of "Cherry-Cherry-Cherry" yields "50 Credits Minus Your Last Payout," probability may be altered in a manner that is favorable to the player if the player's last payout amount was large (e.g., if the player had just hit for 45 credits, the likelihood of achieving one or more winning outcomes might be increased, such that the player's disappointment is minimized).

In some embodiments, a payout amount that is based on a prior payout may be based on a future event (e.g., a future payout amount). In one example, if a slot machine player spins the reels and receives an outcome of "Future-Future-Future," a display screen may indicate "Pays 10 credits multiplied by your next payout amount!". An indication such as "10×? credits" may persist on a display screen while the player continues to spin the reels. Several spins later, if a player achieves "Bell-Bell-Bell," the player may then be paid both (i) 15 coins for the outcome of "Bell-Bell-Bell", and (ii) 150 coins for the outcome of "Future-Future-Future" (10×15). In another embodiment, a player may achieve an outcome which yields a "Mystery Payout" to be determined at a later time. For example, a player may achieve an outcome of "Fish-Fish-Fish," and a number of animated fish may appear in a fish tank presented on a secondary display screen. Several spins later, a player may achieve an outcome of "Big Net-Big Net-Big Net." An animated net may then grab a large amount of fish from the tank (the size of the net used may be proportional to the number of fish grabbed), and the player may be paid a number of coins based on the number of fish collected. Thus, the outcome of "Fish-Fish-Fish" yields a payout that is based on a subsequently achieved outcome.

A payout may be based on a variety of other considerations, including but not limited to:

(i) Time of day: For example, an outcome of "Cherry-Cherry-Cherry" might pay 10 credits between 4:00 and 5:00, and 15 credits between 5:00 and 6:00;

(ii) Time since last payout: For example, an outcome of "Clock-Clock-Clock" might yield three credits multiplied by the number of minutes since a player last achieved a winning outcome.

(iii) The status of at least one other gaming device: For example, an outcome of "Chair-Chair-Chair" may pay 0 credits if no adjacent gaming devices are occupied, 10 credits if one adjacent gaming device is occupied, 20 credits if two adjacent gaming devices are occupied, etc. In another embodiment, a payout amount may be calculated based on the occupancy of a casino floor. In a further embodiment, a payout amount of a first gaming device may be based on an outcome or payout amount achieved at a second gaming device.

(iv) A loss amount: For example, a slot machine player may (i) establish a balance of 40 credits, (ii) wager 10 credits, (iii) initiate a game play (e.g., pull a handle), and (iv) achieve a losing outcome (e.g., "Plum-Lemon-Bar"). Thus, the player's loss amount may be thought of as 10 credits. Accordingly, a payout amount may be based on the loss amount. For example, an outcome of "Reset-Reset-Reset" pays a number of credits equal to a determined loss amount.

(v) A status associated with a player: For example, an outcome of "Cherry-Cherry-Cherry" might pay 10 credits when achieved by a first player and 20 credits when achieved by a second player (e.g., a record of a player database associates a status rating with one or more players). Such status ratings may be based on, for example, any or all of the following measures associated with a player: (i) a win amount, (ii) a loss amount, (iii) a theoretical win amount, (iv) an average wager amount; (v) an amount of gambling done by the player; and (vi) a loyalty program status (e.g., registered or unregistered).

Any combination of the above-described considerations is imagined within the scope of the present invention (e.g., a payout amount is based on a previous payout amount and the time of day).

Figure 11A:
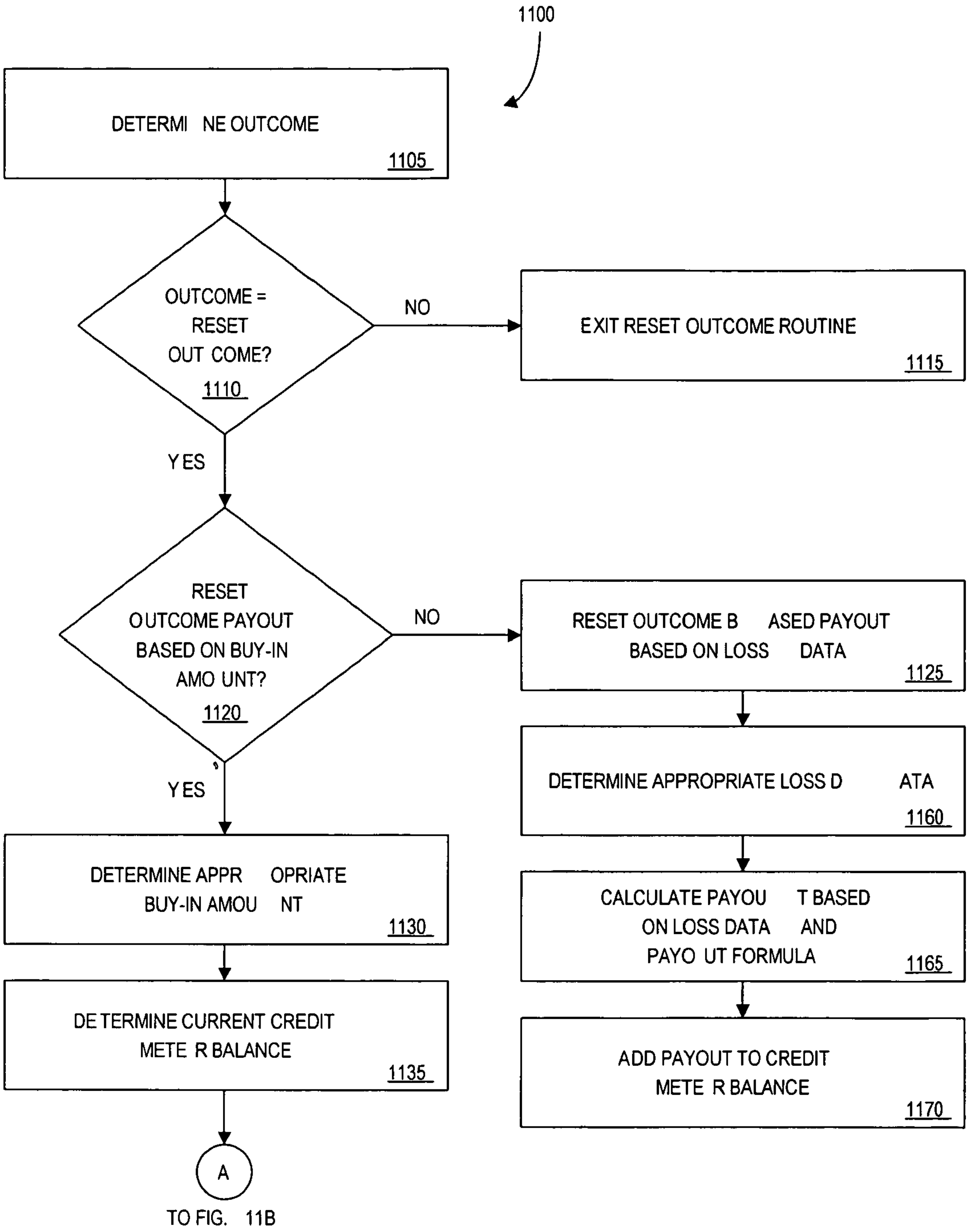
Figure 11B:
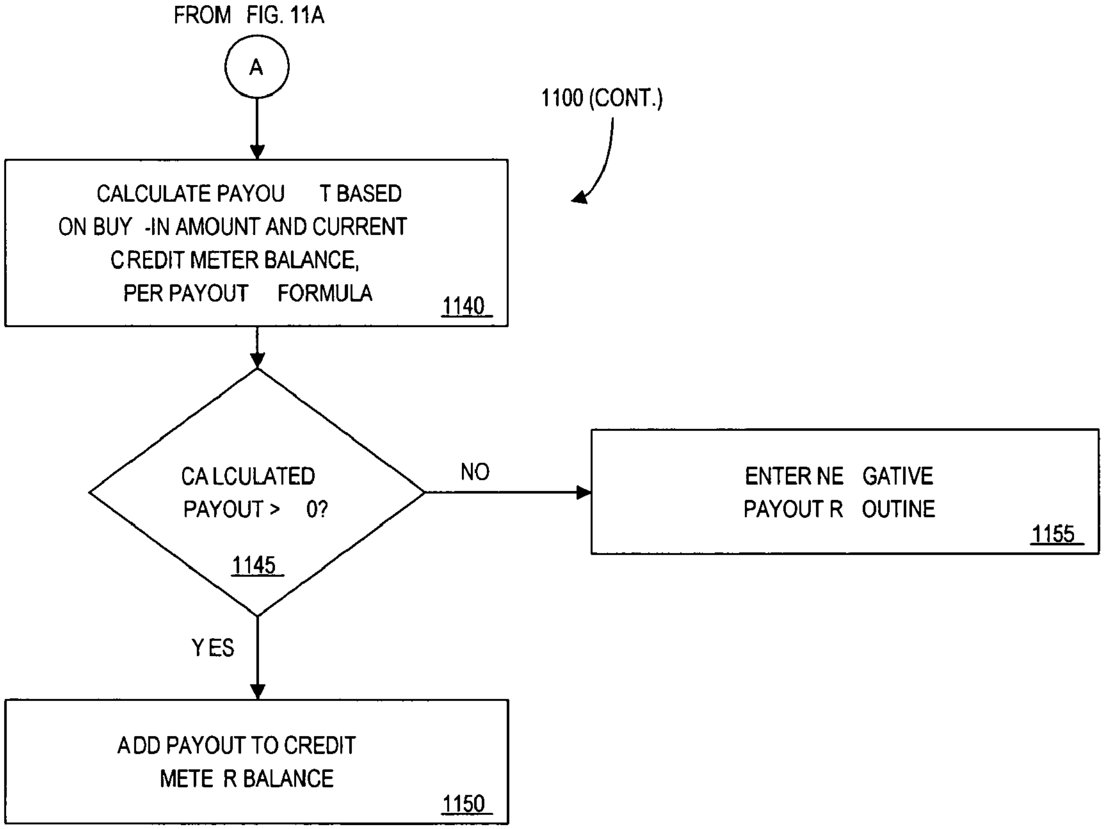

Referring now to FIGS. 11A and 11B, illustrated therein is a process 1100 that may be carried out in accordance with various embodiments of the present invention. Process 1100 may be performed by any combination of any of the devices described herein. Process 1100 may be performed, for example, in embodiments in which a reset outcome is available (e.g., in a process for determining payouts that utilizes a payout table that includes a reset outcome). It should be noted that process 1100 assumes that a reset outcome may be an outcome based on a buy-in amount (e.g., an initial buy-in amount or a total buy-in amount) or loss data (e.g., session loss data). However, in other embodiments a reset outcome may be based on other information, as would be understood upon a reading of the present disclosure.

In step 1105 an outcome is determined. An outcome may be determined in any of the manners described with respect to step 1005 (FIG. 10).

In step 1110, it is determined whether the outcome determined in step 1105 is a reset outcome. For example, it is determined whether a payout corresponding to the outcome determined in step 1105 is a payout based on a buy-in amount, a loss amount and/or a current gaming device balance. If the outcome determined in step 1105 is not a reset outcome, process 1100 continues to step 1115, in which process 1100 is exited. For example, a conventional process for determining a payout corresponding to an outcome may be entered. In another example, process 1000 may be entered. If the outcome determined in step 1105 is a reset outcome, the process 1100 continues to step 1120. Determining whether an outcome is a reset outcome may comprise, in one embodiment, determining whether a payout corresponding to the outcome is defined by a formula that includes a calculation involving a buy-in amount, a loss amount, and/or a credit balance. For example, a payout database may be accessed and the formula, if any, corresponding to the outcome determined in step 1105 may be retrieved.

It should be noted that a variety of types of reset outcomes are encompassed by the embodiments described herein. In one embodiment, any slot machine outcome wherein a particular symbol (e.g., a "Snap Back!" symbol) appears disposed along an activated payline qualifies as a reset outcome. In a video poker game, a reset outcome may be a "straight flush" (e.g., "Get a straight flush and refund all your losses!") or another predetermined outcome that is designated as a reset outcome. In another embodiment, a player may achieve a reset outcome as the result of a bonus round (e.g., during a bonus round, a wheel spins and lands on "100% Refund"). In a still further embodiment, a gaming device player must meet a "minimum play" requirement before the player is eligible to achieve a reset outcome (e.g., the player has played for at least 10 minutes, the plays has played at least 5 hands of video poker, etc.).

In step 1120 it is determined whether the payout corresponding to the reset outcome determined in step 1105 is based on a buy-in amount (e.g., an initial buy-in amount or a total buy-in amount). If so, the process 1100 continues to step 1130. Otherwise, the process 1100 continues to step 1125.

In step 1130, a buy-in amount is determined. Step 1130 may include determining the type of buy-in amount that is to be determined (e.g., an initial buy-in amount versus a total buy-in amount) if more than one type of buy-in amount is possible.

In one embodiment, determining a buy-in amount may comprise determining a player identifier and/or a session identifier associated with the outcome. For example, a player identifier of a player tracking card currently inserted into the gaming device at which the outcome is obtained may be determined. A variety of methods for identifying players are imagined. For example, a gaming device may identify a player by, (i) receiving a player tracking card, (ii) receiving a player identification code (e.g., a player enters a "PIN" code using a touch-screen device), (iii) biometric means (e.g., voice or retina recognition), and the like. In other embodiments, determining a buy-in amount may comprise receiving a signal indicating to begin a gaming session (e.g., a player presses a "Play Now!" button).

As described, a buy-in amount may comprise an initial buy-in amount. Accordingly, in one or more embodiments, determining a buy-in amount may comprise determining an initial credit balance established by a gaming device player. For example, if a player approaches a slot machine and deposits a $20 bill (or, e.g., a cashless gaming receipt with a face value of $20), a determined buy-in amount may be $20. It should be noted that if the player deposits no further currency, the initial balance of $20 may be thought of as both an initial buy-in amount and a total buy-in amount. In one embodiment, an initial buy-in amount may be stored in a memory and/or database (e.g., a session database) and accessed in the performance of step 1130.

As also described, a buy-in amount may comprise a total buy-in amount. Continuing with the example, should the player continue play for a period of time, and subsequently deposit more currency (e.g., another $20), the total buy-in amount may be determined to be $40.

In step 1135, the current credit meter balance is determined. For example, a memory of the gaming device at which the outcome determined in step 1105 has been obtained may be accessed and the credit meter balance at the time the outcome was obtained may be determined. As stated, many slot machines display such a current balance by means of an electronic credit meter (i.e., an LED display displays 35 credits).

In embodiments in which step 1135 is being performed by a device other than the gaming device at which the outcome determined is step 1105 is obtained, step 1135 may comprise receiving an indication of the credit meter balance from the gaming device and/or querying the gaming device for the credit meter balance.

In one embodiment, determining a credit balance may comprise deriving the credit meter balance from other data. For example, if a slot machine player (i) establishes an initial balance of 50 credits, and (ii) loses 15 credits after achieving several losing outcomes, a gaming device may determine that a current balance is 35 credits.

In some embodiments, the step of determining a current balance may comprise comparing the current balance to an initial balance or total buy-in amount. For example, a gaming device may (i) determine a total buy-in of 100 credits in Step 100, (ii) determine a current balance of 83 credits in Step 200, and (iii) determine that the current balance is 17 less than the total buy-in (e.g., a "session loss amount" is 17 credits).

It should be noted that a buy-in amount and/or credit meter balance data may be associated with a particular player, gaming device and/or gaming session as described.

In step 1140, the payout corresponding to the outcome determined in step 1105 is calculated based on the buy-in amount determined in step 1130 and the current credit meter balance determined in step 1135. This may be performed based on the formula defining the payout, the formula corresponding to the outcome in a payout database. For example, assuming payout database 700C is being utilized and an outcome of "reset-reset-reset" is determined in step 1105, the payout may be determined based on the formula indicated in record R700C-7. According to this formula, the credit meter balance is to be set to the initial buy-in amount in response to the obtainment of the outcome "reset-reset-reset." Thus, assuming that the initial buy-in amount is determined to be twenty (20) coins and the current credit meter balance is determined to be four (4) coins, the payout would be determined to be sixteen (16) coins, since sixteen (16) coins is the amount necessary to reset the credit meter balance to the initial buy-in amount.

In step 1145 it is determined whether the payout determined in step 1140 is greater than zero. If so, the process continues to step 1150, in which step the payout determined in step 1140 is added to the credit meter balance or otherwise provided in any of the manners of providing an outcome described herein. If it is determined that the payout determined in step 1140 is not greater than zero (e.g., it is a negative number because the current credit meter balance is greater than the buy-in amount), the process 1100 continues to step 1155. In step 1155 a "negative payout" routine is entered. Such a routine may comprise any of a variety of manners of applying a negative payout. For example, as described herein, in one embodiment the current credit meter balance may be decreased such that it is returned to the initial buy-in amount and the player loses any profits obtained from the current play session. In another embodiment, a player may be allowed to "bank" the reset outcome for future use. In yet another embodiment, it may be determined that the reset outcome is not to be output if the resulting payout would be negative payout. Thus, in the latter embodiment the process 1100 may be performed upon a random number corresponding to an outcome but prior to the outcome being output to the player and, if it turns out in step 1145 that the resultant payout would be a negative payout, another random number and another outcome may be determined in lieu of the outcome determined in step 1105.

Returning to step 1125, if it is determined that the reset outcome is an outcome based on loss data (e.g., a portion or all of the losses sustained by a player during a specified period of time are to be returned to the player as a result of the outcome), the process 1100 continues to step 1160. In step 1160 the appropriate loss data is determined. For example, the formula defining the outcome determined in step 1105 may be retrieved and analyzed to determine what information is necessary to calculate the payout based on the formula. In a more particular example, assuming payout table 700C is being utilized and that the outcome "50% refund-50% refund-50% refund" is determined in step 1105, it may be determined in step 1160 that the loss amount for the entire session is needed to calculate the payout. The appropriate information may then be retrieved or otherwise determined. For example, a session database may be accessed to determined the loss amount for the current session.

The following are some examples of loss amounts upon which a reset outcome may be based:

(i) Session loss amount: For example, a loss amount may be determined by subtracting a current gaming device balance amount from either (i) an initial buy-in amount established at the device, or (ii) a total session buy-in amount (e.g., all the currency deposited into the device during the session);

(ii) Losses incurred during a prolonged period of time. For example, a gaming device may determine (i) an amount of "lifetime losses" incurred by a player (e.g., total losses since the player registered for a player tracking card, which may include losses accrued on a variety of trackable casino games, including table games), (ii) an amount of losses incurred during a particular casino trip or visit, (iii) an amount of losses incurring during a number of hours, etc.; and (iii) Losses incurred at one or more particular gaming devices: For example, a loss amount may comprise a number of credits lost by a player while playing (i) a particular device, (ii) a device characterized by a certain theme (e.g., Monopoly® or Happy Days®), (iii) a device manufactured by a particular firm, etc.

In step 1165, the payout amount for the outcome determined in step 1105 is calculated based on the data determined in step 1165 and the formula corresponding to the outcome. In step 1170 the calculated payout is added to the credit meter balance or otherwise provided to the player associated with the payout, in any of the manners of providing a payout described herein.

A payout based on a loss amount may be determined in a variety of manners, some examples of which follow. A payout based on a loss amount may comprise, for example:

(i) A determined loss amount: For example, turning to FIG. 3, an outcome of "Payback-Payback-Payback" yields a payout that is equal to a determined loss amount (e.g., "100% refund");

(ii) A determined loss amount plus/minus an additional amount of credits: For example, turning to FIG. 3, an outcome of "Payback+3-Payback+5-Payback+2" yields a payout determined by adding 10 credits to a session loss amount;

(iii) A determined loss amount plus a non-cash bonus: For example, a reset outcome may yield a payout equal to a session loss amount, plus $5 in buffet credit. A variety of non-cash bonuses are contemplated, including but not limited to merchant credit, free game plays, and the like. In one embodiment, such benefits may be provided via a cashless gaming ticket;

(iv) A percentage refund of a loss amount: For example, a payout amount for an outcome of "50% Payback-50% Payback-50% Payback" may be calculated by dividing a determined loss amount by two;

(v) A multiple of a determined loss amount: For example, a reset outcome payout may be determined by multiplying a loss amount by two (e.g., "200% Refund" or "Get 2× your losses back!").

As described, in some embodiments a payout corresponding to a reset outcome may correspond to a negative payout. There are a variety of manners of handling such a circumstance, some of which have already been described herein. For example, a reset outcome achieved when a current balance is greater than or equal to a determined buy-in amount may yield or trigger an alternate benefit, such as a bonus round entry, "2× your Buy-In!", etc. In this manner, players may be "made whole" when they are on a losing streak, and be provided with an exciting bonus opportunity when they are "ahead" or "up."

In other embodiments, a player who achieves a reset outcome when a current balance amount is greater than a determined buy-in amount may lose a number of credits. For example, if a player begins a gaming session with a balance of 20 credits, accumulates 15 credits, and subsequently achieves an outcome of "Whammy-Whammy-Whammy," the player may lose the accumulated 15 credits. Methods for reducing a player's credit balance, among other things, are discussed in Applicant's co-pending U.S. Patent No. 60/374,370, filed Apr. 19, 2002, entitled "GAMING DEVICE METHODS AND APPARATUS EMPLOYING ALTERNATE PAYOUT FEATURES," and U.S. patent Ser. No. 10/420,981, filed Apr. 22, 2003, also entitled "GAMING DEVICE METHODS AND APPARATUS EMPLOYING ALTERNATE PAYOUT FEATURES," the entirety of which are incorporated herein by reference for all purposes.

In some embodiments, a gaming device may comprise a "win/loss" status display. Such a display may function to inform a player of a cumulative number of credits won and/or lost. For example, if a player establishes an initial balance of 90 credits and achieves a current balance of 75 credits as the result of several game plays, a status display may indicated "15 Credits Lost." In this manner, players may benefit from being reminded of how many credits they have won or lost. Additionally, players may experience heightened anticipation with respect to reset outcomes if they are aware of what such an outcome may yield (e.g., "I stand to win back the 35 credits I lost!"). In another embodiment, a gaming device may comprise a plurality of credit balance meters (e.g., one meter indicates a buy-in amount, another meter indicates a current balance).

In one embodiment, a player may trigger a gaming device refund by inserting a cashless gaming ticket. For example, upon cashing out from a first device, a player may be provided with two cashless gaming tickets; the first ticket may comprise a "cashout ticket" indicating a monetary value payable to the player, and the second ticket may comprise a barcode and text indicating "Bonus! Insert this ticket at any time to recover your losses (up to 50 credits)!" The player may then approach a second device and insert the first ticket, establishing an initial balance of credits. After losing a number of credits, the player may insert the second ticket, and receive a refund for the number of credits lost.

In one embodiment, a player may customize a reset outcome. For example, a player may access a menu via a touch-screen LCD, and establish "Cherry-Cherry-Cherry" as a reset outcome for a particular game session. Various methods for customizing slot machine parameters are disclosed in Applicant's issued U.S. Pat. No. 6,068,552, filed Mar. 31, 1998, entitled "GAMING DEVICE AND METHOD OF OPERATION THEREOF," the entirety of which is incorporated herein by reference for all purposes.

In some embodiments, a reset outcome may trigger the alteration of a game parameter other than a credit balance. For example, a reset outcome may trigger a gaming device to return to a previous game state. In one such example, a player plays a slot machine game wherein certain reel symbols may be collected (e.g., for each cherry symbol the player receives on an active payline, a cherry is added to an animated fruit basket of a secondary display area). The collected reel symbols may expire as time passes or game play progresses (e.g., the collected fruits, which may be cashed out at the end of the session, rot and lose their value). Accordingly, a reset outcome may enable the player to return to a point at which the player possessed more symbols (i.e., a previous position of non-cash equity within the game). Similarly, a reset outcome may trigger a gaming device to revert to a previous "stage" of a multi-stage slot machine game or bonus round. In another embodiment, a reset outcome may enable a player to revert to a first stage of a two-stage outcome. For example, in a video poker embodiment, a player plays a game of five-card draw. The player receives an initial hand of A♠-K♠-Q♠-J♠-6♥. The player holds everything but the 6♥, and draws in hope of achieving a royal flush. The player is then dealt a "RESET" card (i.e., after discarding the 6♥ and drawing, the player's hand is A♠-K♠-Q♠-J♠-RESET), which enables the player to revert to the A♠-K♠-Q♠-J♠-6♥ and draw once more. Thus, the player may then elect to (i) risk drawing for the royal flush once more, or (ii) attempt a different strategy altogether (e.g., hold just the A♠-K♠).

In some embodiments, a gaming device player may receive a resource during a first game play (e.g., a slot machine player receives an outcome of "Bar-Plum-Refund!"), save the resource (e.g., an output device indicates the player may use one "Refund!" symbol at any time) and use the resource during a second play (e.g., five spins later, the player actuates a button to activate the "Refund!", such that, e.g., the player's losses are then refunded). In some embodiments, such a resource may expire after a certain length of time (e.g., the player has only 10 spins before the resource may no longer be used).

In another embodiment, a player must collect a certain number of symbols, cards, etc. before a resource may be used (e.g., collect five "Reset!" symbols and win back your losses).

In some embodiments, one or more limitations may be associated with reset outcome. For example, a reset outcome may only apply if (i) a game play occurred during a particular time/date, (ii) a loss amount is greater than a certain number of credits, (iii) a player has maintained a certain rate of play, and so on. In other embodiments, a payout awarded as the result of a reset outcome may not be provided until a player meets a play requirement. For example, if a player gets a "100% Refund" payout for achieving a reset outcome and is due 13 credits, the credits may not be paid unless the player continues play for a predetermined length of time.

In some embodiments, a player may pay a premium such that the probability of achieving reset outcome may be increased. For example, a gaming device player may "activate" reset outcomes by paying a small fee before a game session commences.

Of course, in some embodiments a probability of obtaining a reset outcome may be determined and/or adjusted based on factors other than a payment from a player. For example, in one embodiment a probability of obtaining reset outcomes in general and/or of obtaining a particular reset outcome may be determined and/or adjusted based on one or more of the following factors:

(i) a length of a play session: for example, once a player has continuously played a gaming device for thirty (30) minutes a probability of obtaining one or more available reset outcomes is increased); and (ii) how far a player is from an initial buy-in amount and/or the difference between the current credit meter balance and an initial buy-in amount: for example, if the current credit meter balance is less than 50% of the initial buy-in then the probability of obtaining one or more reset outcomes is increased from a first probability to a second probability and if the current credit meter balance is greater than or equal to 100% of the initial buy-in the probability of obtaining one or more reset outcomes is decreased from a first probability to a second probability (e.g., a probability of zero).

It should be noted that adjusting and/or determining a probability of obtaining an outcome may comprise any known manner of adjusting and/or determining a probability of obtaining an outcome. For example, it may comprise adjusting and/or determining a range of random numbers corresponding to the outcome. In another example, it may comprise adjusting and/or determining a number of one or more symbols comprising the outcome on one or more reels of a reeled slot machine. In yet another example, it may comprise adjusting and/or determining a number of cards (e.g, including wild cards) in a deck of cards and/or a number of decks cards are being drawn from.

It should further be noted that adjusting and/or determining a probability of obtaining an outcome may comprise making the outcome available for obtainment. For example, in one embodiment one or more reset outcomes may not be available to a player until and unless the player qualifies for the availability of the outcome. For example, a player may be required to participate in ten consecutive game plays and/or ten minutes of continuous play before a reset outcome is activated such that the probability of obtaining it is greater than zero.

In one embodiment, a payout for a reset outcome may be output as two or more payouts and/or two or more outcomes. For example, assume a player is down 200 credits for a play session. Further assume that a random number is generated for a game play initiated by the player, the random number corresponding to a reset outcome the payout of which is calculated to be 220 credits. Rather than simply outputting an indication of the reset outcome and adding the 220 credits to the credit meter balance as a single result, the result of the outcome may be output in two or more stages. For example, an outcome that corresponds to a twenty (20) credit payout may be selected and output to the player. Then the following message may be output to the player: "Congratulations! You've won a bonus spin!". The payout for the bonus spin may then be output to the player as the 200 credits that is the remainder of the 220 credit payout initially determined for the reset outcome, and be added to the credit meter balance. The outcome for the bonus spin may be determined to be an outcome that corresponds to a 200 credit payout (e.g., a reset outcome or another outcome). Such an embodiment may have the benefit of prolonging the excitement of the game play for the player and perhaps increasing the apparent value of the game play to the player (e.g., the player may perceive a game play that results in two winning outcomes as more valuable than a single winning outcome, even if the net payout is the same).

In some embodiments, a reset outcome may entitle a player to attain a non-cash benefit equal in value to, e.g., a determined loss amount. For example, after losing $7 and achieving an outcome of "Refund-Refund-Refund", a slot machine player may be provided with an alternate refund payout (e.g., a $7 voucher for a casino-maintained steakhouse).

In conclusion, while the methods and apparatus of the present invention have been described in terms of particular embodiments, those skilled in the art will recognize that the present invention may be practiced with modification and alteration without departing from the teachings disclosed herein.

What is claimed is:

1. A method of operating a gaming system, said method comprising:

causing a gaming device processor to randomly determine, based on a first random number, a first random outcome for a first game play of a primary game conducted at a gaming device, wherein the first game play is initiated in response to receiving, from a player, a first initiation signal and a first wager;

causing the gaming device processor to determine a first payout value associated with the first random outcome, wherein the first payout value is based on a probability of obtaining the first random outcome and the first wager;

after the determination of the first payout value, causing the gaming device processor to determine, based on a second random number, a second random outcome for a second game play of the primary game conducted at the gaming device, wherein the second game play is initiated in response to receiving, from the player, a second initiation signal and a second wager, the receipt of said second wager being independent of the first payout value; and causing the gaming device processor to determine a second payout value associated with the second random outcome, wherein an amount of the second payout value is based on an amount of the first payout value.

2. The method of claim 1, wherein the amount of the second payout value is based on the amount of the first payout value only if the second random outcome is a qualifying outcome.

3. The method of claim 2, wherein a qualifying outcome is a second random outcome that is determined within at least one of a predetermined number of game plays and a predetermined period of time from a determination of the first random outcome.

4. The method of claim 1, wherein the amount of the second payout value comprises a result of subtracting at least the amount of the first payout value from a predetermined amount.

5. The method of claim 4, further comprising:

determining the predetermined amount.

6. The method of claim 5, wherein determining the predetermined amount is based on at least one of:

a random number, data representing information associated with the player, data representing information associated with the gaming device and data representing information associated with at least one of the first game play and the second game play.

7. The method of claim 5, which includes selecting the predetermined amount from a plurality of different predetermined amounts.

8. The method of claim 4, wherein the predetermined amount is a maximum amount to be provided for a current segment of a game, wherein the first game play and the second game play are conducted during the current segment, and the amount of the second payout value is determined based on subtracting an amount previously provided during the current segment prior to the determination of the second random outcome from the maximum amount.

9. The method of claim 1, wherein the second payout value comprises a sum of qualifying payouts previously provided to the player, one of which is the first payout value.

10. The method of claim 9, wherein the first payout value is the only qualifying payout.

11. The method of claim 1, further comprising: storing an indication of at least one of the first random outcome and the first payout value in association with a current play session.

12. The method of claim 11, further comprising:

determining that the first random outcome is a qualifying outcome; and only storing the indication of at least one of the first random outcome and the first payout value if the first random outcome is a qualifying outcome.

13. The method of claim 1, wherein determining the second payout value comprises:

determining whether a predetermined amount that is based on a probability of obtaining the second random outcome and the second wager is to be provided or whether the amount of the first payout value is to be provided.

14. The method of claim 13, wherein the step of determining whether a predetermined amount is to be provided is based on at least one of:

a random number, data representing information associated with the player, data representing information associated with a current game parameter and data representing information associated with a play session.

15. The method of claim 1, wherein determining the second payout value comprises:

determining a payout that, when added to a current credit meter balance, results in an amount input by the player to the gaming device prior to the determination of the second random outcome.

16. The method of claim 15, wherein the amount input by the player is a sum of a plurality of amounts input to the gaming device by the player prior to the determination of the second random outcome.

17. The method of claim 15, wherein determining the second payout value comprises:

determining that the first payout value was zero;

determining the first wager; and adding the first wager to the second payout value.

18. The method of claim 1, wherein the second payout value is further based on a parameter of game play.

19. The method of claim 1, further comprising:

outputting the first payout value, and outputting the second payout value.

20. The method of claim 1, further comprising:

outputting, prior to the second random outcome being determined for the second game play, an indication of the second payout value as a payout that corresponds to the second random outcome.

21. The method of claim 20, further comprising:

outputting an indication of how the second payout value was determined.

22. The method of claim 1, wherein the second wager is not based on the first wager.

23. An apparatus, comprising:

a processor; and a storage device in communication with the processor and storing instructions adapted to be executed by the processor to:

determine, based on a first random number, a first random outcome for a first game play of a primary game conducted at a gaming device, wherein the first game play is initiated in response to receiving, from a player, a first initiation signal and a first wager;

determine a first payout value associated with the first random outcome, wherein the first payout value is based on a probability of obtaining the first random outcome and the first wager;

after the determination of the first payout value, determine based on a second random number, a second random outcome for a second game play of the primary game conducted at the gaming device, wherein the second game play is initiated in response to receiving, from the player, a second initiation signal and a second wager, the receipt of said second wager being independent of the first payout value; and determine a second payout value associated with the second random outcome, wherein an amount of the second payout value is based on an amount of the first payout value.

24. A non-transitory computer readable medium storing instructions configured to be executed by a gaming device processor to:

determine, based on a first random number, a first random outcome for a first game play of a primary game conducted at a gaming device, wherein the first game play is initiated in response to receiving, from a player, a first initiation signal and a first wager;

determine a first payout value associated with the first random outcome, wherein the first payout value is based on a probability of obtaining the first random outcome and the first wager;

after the determination of the first payout value, determine, based on a second random number, a second random outcome for a second game play of the primary game conducted at the gaming device, wherein the second game play is initiated in response to receiving, from the player, a second initiation signal and a second wager, the receipt of said second wager being independent of the first payout value; and determine a second payout value associated with the second random outcome, wherein an amount of the second payout value is based on an amount of the first payout value.

25. A method of operating a gaming system, said method comprising:

causing a gaming device processor to determine, based on a first random number, a first random outcome for a first game play of a primary game conducted at a gaming device, wherein the first game play is initiated in response to receiving, from a player, a first initiation signal and a first wager;

causing the gaming device processor to determine a first payout value associated with the first random outcome, wherein the first payout value is based on a probability of obtaining the first random outcome and the first wager;

causing the gaming device processor to determine, based on a second random number, a second random outcome for a second game play of the primary game conducted at the gaming device, wherein the second game play is initiated in response to receiving a second initiation signal and a second wager, the receipt of said second wager being independent of the first payout value; and causing the gaming device processor to determine a second payout value associated with the second random outcome, wherein an amount of the second payout value is based on an amount of the first payout value and the second payout value is independent of the second random outcome.

26. The method of claim 25, wherein a game play segment comprises a plurality of game plays including the first and second game plays, wherein the second game play comprises a final game play of the game play segment, and wherein the second payout value comprises a sum of all previous payouts from the plurality of game plays subtracted from a predetermined maximum amount obtainable for the game play segment.

27. A gaming device comprising:

at least one display device;

at least one input device;

at least one processor; and at least one memory device which stores a plurality of instructions, which when executed by the at least one processor, cause the at least one processor to operate with the at least one display device and the at least one input device to:

determine whether a game play occurrence of an outcome that is randomly determined as a result of an initiation signal, a wager, and a determination of a random number, is: (i) independent of, or (ii) dependent upon, a game play parameter based on a different game play occurrence, the different game play occurrence being a result of at least one different initiation signal, at least one different wager, and at least one different random number; and if it is determined that the outcome is dependent upon the game play parameter that is based on the different game play occurrence, determine, based on the game play parameter that is based on the different game play occurrence, a payout value for the game play occurrence of the randomly determined outcome.

28. The gaming device of claim 27, wherein the game play parameter that is based on the different game play occurrence comprises a game play parameter based on a previous game play occurrence.

29. The gaming device of claim 28, wherein the game play parameter based on the previous game play occurrence comprises a number of times that the same outcome has previously been randomly determined in a particular segment of game play.

30. The gaming device of claim 28, wherein the outcome comprises a first randomly determined outcome and wherein the game play parameter based on the previous game play occurrence comprises an occurrence of a particular second randomly determined outcome between the game play occurrence of the first randomly determined outcome and a previous game play occurrence of the first randomly determined outcome in a particular segment of game play.

31. The gaming device of claim 28, wherein the game play parameter based on the previous game play occurrence comprises a number of qualifying wins in a particular segment of game play and wherein the payout value comprises a predetermined base amount divided by the number of qualifying wins.

32. The gaming device of claim 28, wherein the game play parameter based on the previous game play occurrence comprises a number of times that a particular symbol has been displayed in a segment of game play and wherein the payout value comprises a predetermined base amount multiplied by the number of times that the particular symbol has been displayed.

33. The gaming device of claim 28, wherein the game play parameter based on the previous game play occurrence comprises an amount of time since a win has been determined in a segment of game play and wherein the payout value comprises a predetermined base amount times the amount of time since a win has been determined.

34. The gaming device of claim 28, wherein the game play parameter based on the previous game play occurrence comprises a number of bonus rounds entered into in a segment of game play.

35. The gaming device of claim 28, wherein the payout value comprises at least one of: (i) a predetermined base amount minus a sum of all previous payout values provided during a segment of game play; (ii) the predetermined base amount plus at least one of the previous payout values provided during the segment of game play; (iii) the predetermined base amount divided by at least one of the previous payout values provided during the segment of game play; (iv) the predetermined base amount multiplied by at least one of the previous payout values provided during the segment of game play; and (v) a sum of a plurality of the previous payout values provided during the segment of game play.

36. The gaming device of claim 28, wherein the game play parameter that is based on the different game play occurrence comprises a number of proximate gaming devices that are occupied.

37. The gaming device of claim 28, wherein the payout value is further determined based on a status of a player associated with the game play occurrence of the outcome.

38. The gaming device of claim 27, wherein the game play parameter that is based on the different game play occurrence comprises a game play parameter based on a future game play occurrence.

39. A gaming device comprising:

a processor; and a memory in communication with the processor, wherein the memory stores instructions that when executed by the processor cause the processor to:

determine, based on a first random number, a first random outcome for a first game play of a game conducted at the gaming device, wherein the first game play is initiated in response to receiving, from a player, a first initiation signal and a first wager;

determine a first payout value associated with the first random outcome, wherein the first payout value is based on a probability of obtaining the first random outcome and the first wager;

after the determination of the first payout value, determine, based on a second random number, a second random outcome for a second game play of the game conducted at the gaming device, wherein the second game play is initiated in response to receiving, from the player, a second initiation signal and a second wager, wherein the second wager is not equivalent to the first payout value and the receipt of the second wager is independent of the first payout value; and determine a second payout value associated with the second random outcome, wherein an amount of the second payout value is based on an amount of the first payout value.

* * * * *

UNITED STATES PATENT AND TRADEMARK OFFICE

CERTIFICATE OF CORRECTION

PATENT NO. : 7,850,522 B2
APPLICATION NO. : 11/113703
DATED : December 14, 2010
INVENTOR(S) : Walker et al.

It is certified that error appears in the above-identified patent and that said Letters Patent is hereby corrected as shown below:

IN THE CLAIMS:

Column 43, line 59, replace "a qualifying outcome" with --the qualifying outcome--.

Column 44, line 8, after "device" insert a --,--.

Column 44, line 48, after "parameter" insert a --,--.

Signed and Sealed this
Fifteenth Day of March, 2011

David J. Kappos

David J. Kappos
*Director of the United States Patent and Trademark Office*